United States Patent
Bellifemine et al.

(10) Patent No.: US 12,024,109 B2
(45) Date of Patent: Jul. 2, 2024

(54) INFANT/CHILD ANTI-ABANDONMENT SYSTEM FOR VEHICLES AND PROCESS FOR SIGNALING AN INFANT/CHILD INSIDE A VEHICLE

(71) Applicant: TECNIMED S.r.l., Vedano Olona (IT)

(72) Inventors: Francesco Bellifemine, Vedano Olona (IT); Cinzia Bellifemine, Varese (IT)

(73) Assignee: TECNIMED S.r.l., Vedano Olona (IT)

( * ) Notice: Subject to any disclaimer, the term of this patent is extended or adjusted under 35 U.S.C. 154(b) by 50 days.

(21) Appl. No.: 17/782,143

(22) PCT Filed: Dec. 2, 2020

(86) PCT No.: PCT/IB2020/061374
§ 371 (c)(1),
(2) Date: Jun. 2, 2022

(87) PCT Pub. No.: WO2021/111323
PCT Pub. Date: Jun. 10, 2021

(65) Prior Publication Data
US 2023/0001873 A1    Jan. 5, 2023

(30) Foreign Application Priority Data
Dec. 2, 2019 (IT) .......................... 102019000022692

(51) Int. Cl.
*B60R 21/015* (2006.01)
*B60N 2/00* (2006.01)
(Continued)

(52) U.S. Cl.
CPC ........ *B60R 21/01546* (2014.10); *B60N 2/002* (2013.01); *B60N 2/2812* (2013.01);
(Continued)

(58) Field of Classification Search
CPC ........ B60R 21/01546; B60R 21/01556; B60R 22/48; B60R 2022/4816; B60N 2/002;
(Continued)

(56) References Cited

U.S. PATENT DOCUMENTS 7,714,737 B1    5/2010 Morningstar
8,063,788 B1 *  11/2011 Morningstar .......... G08B 21/24
                                                              340/439
(Continued)

FOREIGN PATENT DOCUMENTS

CN      110435584 A      11/2019
IT      MI20 112 341 A1  6/2013

OTHER PUBLICATIONS

European Patent Office, International Search Report for PCT/IB2020/061374, dated May 2, 2021, EPO, P.B. 5818 Patentlaan 2, NL—2280 HV Rijswijk.

(Continued)

*Primary Examiner* — Brian Wilson

(57) ABSTRACT

The present invention relates to an anti-abandonment system comprising: a first sensor (2) associable with a restraining device (R) placed in the vehicle, a second sensor (3) associable with a fastening tab or with a fastening buckle of a safety belt of the vehicle. The anti-abandonment system comprises a control unit connected to the first and second sensors and configured to perform a control procedure comprising the steps of: determining, as a function of the signal emitted by the first sensor, the presence of a child and/or an infant on the restraining device; determining, as a function of the signal emitted by the second sensor, a fastened or unfastened condition of the safety belt, defining an alarm condition in the event that the control unit determines the presence of a child and/or an infant on the restraining device and at the same time the unfastened condition of the safety belt. The present invention also (Continued)

regards a process for warning of a potentially hazardous situation relative to the presence of an infant/child inside a vehicle.

18 Claims, 12 Drawing Sheets

(51) Int. Cl.
    *B60N 2/28*      (2006.01)
    *B60R 22/48*      (2006.01)
    *G08B 7/06*      (2006.01)
    *G08B 21/22*      (2006.01)
    *G08B 21/24*      (2006.01)

(52) U.S. Cl.
    CPC ........ *B60R 21/01556* (2014.10); *B60R 22/48* (2013.01); *G08B 7/06* (2013.01); *G08B 21/22* (2013.01); *G08B 21/24* (2013.01); *B60R 2022/4816* (2013.01)

(58) Field of Classification Search
    CPC .... B60N 2/0021; B60N 2/003; B60N 2/0035; B60N 2/2812; G08B 7/06; G08B 21/22; G08B 21/24
    See application file for complete search history.

(56) References Cited

U.S. PATENT DOCUMENTS

| | | | |
|---|---|---|---|
| 8,816,839 B1* | 8/2014 | Rick | B60Q 1/00 340/447 |
| 9,676,325 B1* | 6/2017 | Duan | G08B 21/24 |
| 10,232,821 B1* | 3/2019 | Cubit | B60R 25/01 |
| 2010/0283593 A1* | 11/2010 | Miller | B60C 23/0408 340/447 |

OTHER PUBLICATIONS

European Patent Office, Information on Search Strategy for PCT/IB2020/061374, dated May 2, 2021, EPO, P.B. 5818 Patentlaan 2, NL—2280 HV Rijswijk.

European Patent Office, Written Opinion of the International Searching Authority for PCT/IB2020/061374, dated May 2, 2021, EPO, P.B. 5818 Patentlaan 2, NL—2280 HV Rijswijk.

* cited by examiner

INFANT/CHILD ANTI-ABANDONMENT SYSTEM FOR VEHICLES AND PROCESS FOR SIGNALING AN INFANT/CHILD INSIDE A VEHICLE

FIELD OF THE FINDING

The object of the present invention is an infant/child anti-abandonment system for vehicles; the invention also regards a process for warning of a potentially hazardous situation relative to the presence of an infant/child inside a vehicle. The present finding is situated in the field of accessories and/or safety devices destined for controlling the presence of children inside automobiles.

STATE OF THE ART

The problem of parents' accidentally abandoning/leaving children/infants inside motor vehicles is well-known and quite widespread. Such situations sometimes turn tragic, when the parents do not realize in time that they have left their infant/child in the car. In order to attempt to resolve such problem, over time many different safety systems have been designed. A first example of a known safety system is described in the document US 2003/0122662. Such safety system comprises a sensor associated with the buckles or with the systems for locking the belts of the child's child seat; the sensor is configured to send, to a dedicated control unit, a positive warning signal indicative of the presence of the child on the child seat. The sensor continues to detect the locking of the belts and to communicate such state to the safety system: if the safety system does not receive the positive signal emitted by the sensor, an alarm unit provides for emitting an acoustic alarm signal. The safety system is also provided with a sensor for detecting the distance lying between the keys of the driver and the child seat, so that when such distance exceeds a preset maximum limit, the alarm unit emits a signal adapted to remind the driver that the child is still situated inside the passenger compartment. The safety system is also provided with a sensor for detecting the state of the driver door. Such sensor is activated when the door of the driver is opened. The alarm unit is arranged for emitting a signal when the door of the driver is opened, the child seat of the child is fastened and the distance between the driver and the child seat is greater than the limit distance.

A second example of a safety system is described in the document US 2005/0253692. In particular, such document refers to a safety system which provides for a weight sensor capable of detecting the presence of a child on a child seat placed inside a vehicle. When the child is placed inside the vehicle on the weight sensor, his/her presence is detected. When the driver turns off the vehicle, an alarm unit emits a signal relative to the presence of the child inside the vehicle. The removal of the child from his/her position disables the weight sensor, consequently deactivating the safety system. A third example of a safety system that uses a weight sensor with switch is illustrated in the document U.S. Pat. No. 7,714,737. Together with the weight sensor, the safety system provides for a fastening sensor capable of verifying the locking of the belts of the driver. The sensor is constituted by two separate coupling portions, respectively configured for being respectively associated with the fastening tab and with the fastening buckle of the safety belt. The first and the second coupling portions are configured for cooperating with each other such that the sensor can signal to a control unit the locking condition of the belt, i.e. the condition for engaging the tab in the fastening buckle of the belt. When the safety system detects the absence of the driver, intended as the unfastened condition of the safety belt and the presence of the child on the child seat, it emits an alarm signal relative to the abandonment of the child inside the vehicle. Further examples of safety systems are for example described in the U.S. Pat. No. 8,063,788, in the Italian national patent application IT MI20112341A1 and in the Chinese patent application No. CN 110435584A. Even if the known safety systems allow a control of the presence of children inside the vehicle, the Applicant has verified that such known systems are not free of drawbacks and that they can be improved with regard to various aspects, mainly in relation to the complexity of such systems, to the costs, to the ease and simplicity of installation and applicability, as well as to the possible reuse of the same with other child seats or vehicles.

OBJECT OF THE INVENTION

The object the present invention is therefore that of resolving at least one of the drawbacks and/or limitations of the preceding solutions. A first objective of the present invention is to provide an anti-abandonment system and an effective signaling/warning process, capable of readily warning of a potentially hazardous situation relative to an infant/child present inside a vehicle, hence allowing the prevention of the abandonment thereof. Another object the present invention is to provide an anti-abandonment system that is simple and inexpensive; in particular, one object of the present invention is to provide an all-purpose anti-abandonment system, easy to install and apply, on any vehicle without requiring the intervention of specialized technicians. These objects and still others, which will be clearer from the following description, are substantially achieved by an anti-abandonment system and a signaling process in accordance with one or more of the enclosed claims and/or of the following aspects.

SUMMARY

Aspects of the finding are described hereinbelow. In one aspect, an anti-abandonment system (1) is provided in order to warn of a potentially hazardous situation relating to a child and/or an infant present inside a vehicle, said vehicle being of the type comprising at least one safety belt for a driver of the vehicle, said safety belt comprising at least one webbing (C) designed to restrain the body of the driver, at least one fastening tab (L) stably carried by the webbing (C) and a fastening buckle (F) associated with an anchorage point of the vehicle and configured to cooperate with the fastening tab (L) in order to define:
  at least one fastened condition of the safety belt during which the fastening tab (L) and the fastening buckle (F) are stably engaged with each other,
  at least one unfastened condition of the safety belt during which the fastening tab (L) and the fastening buckle (F) are uncoupled;
in which the anti-abandonment system (1) comprises:
  at least one first sensor (2) associable with a restraining device (R), said restraining device being positionable inside the vehicle and configured to receive in abutment a child and/or an infant, in which said first sensor (2) is configured to emit a signal representative of the presence or not of a child and/or an infant on the restraining device (R), at least one second sensor (3) associable with the safety belt of the driver and configured to emit a signal representative of the fastened condition or of the unfastened condition of the safety belt of the driver, at least a control unit (50) connected to the first and second sensors (2, 3) and configured to perform a control procedure comprising the steps of:
- determining, as a function of the signal emitted by the first sensor (2), the presence of a child and/or an infant on the restraining device (R),
- determining, as a function of the signal emitted by the second sensor (3), the fastened condition or the unfastened condition of the safety belt of the driver,
- defining an alarm condition in the event that the control unit (50) determines the presence of a child and/or an infant on the restraining device and at the same time the unfastened condition of the safety belt of the driver.

In a further aspect in accordance with the preceding aspect the second sensor (3) is configured to be associated exclusively with only one between the fastening tab (L) and the fastening buckle (F) of the safety belt, optionally of the safety belt for the driver.

In a further aspect in accordance with any one of the preceding aspects the control unit (50), during the performance of the control procedure, is configured in order to define the alarm condition if the same control unit (50) determines the passage from the fastened condition to the unfastened condition of the safety belt of the driver, during the determination of the presence of a child and/or an infant on the restraining device (R).

In a further aspect in accordance with any one of the preceding aspects the control unit (50) is configured to have an active condition following the simultaneous determination of the presence of a child and/or an infant on the restraining device (R) and the determination of the fastened condition of the safety belt of the driver. In a further aspect in accordance with any one of the preceding aspects the control unit, during the active condition, is configured to perform said control procedure adapted to define the alarm condition. In a further aspect in accordance with any one of the preceding aspects the control unit is configured to perform the control procedure only during the active condition thereof.

In a further aspect in accordance with any one of the preceding aspects the control unit is configured to have a deactivated condition which is defined in the event that the presence of a child and/or an infant is not determined by the control unit on the restraining device (R). In a further aspect in accordance with any one of the preceding aspects, the control unit, during the deactivated condition, is configured to not perform the control procedure.

In a further aspect in accordance with any one of the preceding aspects the second sensor (3) is associable with only one between said fastening tab (L) and said fastening buckle (F) of the safety belt while on the other between said fastening buckle (F) and said fastening tab (L) the second sensor is not present. In a further aspect in accordance with any one of the preceding aspects the second sensor (3) is associable with only one between said fastening tab (L) and said fastening buckle (F) of the safety belt while on the other between said fastening buckle (F) and said fastening tab (L) no component of the second sensor (3) is present.

In a further aspect in accordance with any one of the preceding aspects the second sensor (3) is distinct from the safety belt. In a further aspect in accordance with any one of the preceding aspects in which no component of the second sensor (3) is configured to be defined by at least one part of the safety belt.

In a further aspect in accordance with any one of the preceding aspects the second sensor (3) is the only component of the anti-abandonment system dedicated to emitting the signal representative of the fastened condition or of the unfastened condition of the safety belt of the driver.

In a further aspect in accordance with any one of the preceding aspects the control unit is configured to determine the fastened or unfastened condition of the safety belt of the driver only by means of the signal emitted by the second sensor (3).

In a further aspect in accordance with any one of the preceding aspects the anti-abandonment system comprises at least one coupling element (4) configured to be stably engaged with the fastening buckle (F) of the safety belt. In a further aspect in accordance with any one of the preceding aspects the second sensor (3) is stably carried by the coupling element (4). In a further aspect in accordance with any one of the preceding aspects the signal emitted by the second sensor (3) is representative of the direct presence of the fastening tab (L) in engagement with the fastening buckle (F) to define said fastened condition of the safety belt of the driver. In a further aspect in accordance with any one of the preceding aspects the fastening buckle (F) is of the type comprising a block (F1) having a compartment inside which a locking mechanism is housed, in which the fastening tab (L) is of the type comprising an insertion portion (L1) configured to being inserted at least partially in the compartment of the block (F1) and to be stably engaged with the locking mechanism of the latter, in which the coupling element (4) is engaged, optionally directly, with the block (F1) of the fastening buckle (F) outside the compartment.

In a further aspect in accordance with any one of the preceding aspects the signal of the second sensor (3) is representative of a position of the inserting portion (L1) of the fastening tab (L) in the compartment of the block (F1) and hence of an engagement condition of the insertion portion (L1) with the locking mechanism of the block (F1) to define said fastened condition of the safety belt.

In a further aspect in accordance with any one of the preceding aspects in which the control unit, following the reception of the signal by the second sensor (3), is configured to determine the direct presence of the fastening tab (L1), in particular in coupling with the fastening buckle.

In a further aspect in accordance with any one of the preceding aspects the block (F1) comprises a slot (F2) configured to allow the insertion of the inserting portion (L1) of the fastening tab (L) into the housing compartment of the block, in which the second sensor (3) is configured to be placed in proximity to the slot (F2) of the block (F1) in a manner such that the same second sensor (3) can emit a signal representative of the direct presence of the fastening tab (L). In a further aspect in accordance with any one of the preceding aspects the second sensor is configured to directly detect the presence of the inserting portion (L1).

In a further aspect in accordance with any one of the preceding aspects the control unit (50) is also carried by the coupling element (4).

In one aspect in accordance with any one of the preceding aspects, the coupling element (4) comprises:
- at least one support (40a),
- at least one holding element (40b) engaged with the support (40a), the holding element (40b) being configurable in an engagement configuration in which it stably constrains the block (F1), optionally preventing the relative movement between the fastening buckle (F) and the coupling element (4), in which in said engagement configuration, the holding element (40b) has at least one blocking portion active on the block (F1) on the opposite side of the support (40a) to at least partially secure the block (F1) and press it towards the support (40a), holding it in position.

In particular the holding element (40b)—whether this comprises a jaw (4b), two jaw half-parts (e.g. which only partly enclose the corresponding face of the block), a clamp to be tightened or locked in position, or a deformable elastic element in order to receive the block in insertion—defines the blocking portion which is active on the opposite face of the block (F1) with respect to the face which faces towards the support (40a), the blocking portion and the support are shaped such that in the engagement configuration, the block F1 is held via pressure by the forces which is generated between support (40a) and holding element (40b)

In one aspect in accordance with any one of the preceding aspects, the holding element (40b) is configured to define, possibly in cooperation with the support (40a), a seat (40d), e.g. the seat (40d) being a through seat adapted to receive the block (F1).

In a further aspect in accordance with the preceding aspect, said holding element (40b), possibly in cooperation with the support (40a), defines a winding body configured in use for enclosing the block (F1) on all sides thereof, the winding body defining said seat (40d), optionally having a passage of size smaller than the transverse size of the block (F1) in order to allow a stable interference coupling.

In a further aspect in accordance with any one of the preceding aspects, in which the holding element (40b), optionally in cooperation with the support element (40a), defines an external perimeter profile delimiting the seat (40d), said seat (40d) being configured to receive in insertion the block (F1) of the fastening buckle.

In a further aspect in accordance with any one of the preceding aspects, the holding element (40b) has the capacity of being deformed, optionally elastically, so as to allow the engagement, in particular the stable and removable engagement, between the coupling element (4) and the block (F1).

In a further aspect in accordance with any one of the preceding aspects, in which the holding element (40b) is made of rubber or silicone.

In a further aspect in accordance with any one of the preceding aspects, in which the holding element (40b) is movable relative to the support (4a) at least between:
- a first operating position in which the holding element (40b) is disengaged from the support (4a),
- a second operating position in which the holding element (40b) is engaged with the support (4a) defining the seat (40d), in which in the second operating position, the holding element (40b) is engaged with the block (F1) of the fastening buckle (F).

In a further aspect in accordance with any one of the preceding aspects, in which the coupling element (4) comprises at least one locking system (42) defined on the support (40a) configured to constrain the holding element (40b) in the second operating position.

In a further aspect in accordance with any one of the preceding aspects, in which the holding element (40b) is movable relative to the locking system (42) during the passage between the first and the second operating position.

In a further aspect in accordance with any one of the preceding aspects, in which the holding element (40b) has an elongated body extending along a predetermined longitudinal profile between a first and a second end portion, said elongated body being engaged with the support (40a) at the first end portion and being engaged with the locking system (42), in the second operating position of the holding element (40b), at the second end portion.

In a further aspect in accordance with any one of the preceding aspects, in which the elongated body of the holding element (40b) has a predetermined number of locking teeth (43) defined at the second end portion of the same elongated body and configured to be engaged with the locking system (42).

In a further aspect in accordance with any one of the preceding aspects, in which the locking teeth (43) are separated from each other and spaced along the longitudinal extension of the elongated body.

In a further aspect in accordance with any one of the preceding aspects, in which each locking tooth (43) emerges transversely from the elongated body defining a protuberance configured to engage the locking system (42).

In a further aspect in accordance with any one of the preceding aspects, the elongated body has a seat defined in interposition between two protuberances that are adjacent to each other, configured to house the hook (44) in engagement with the locking system (42).

In a further aspect in accordance with any one of the preceding aspects, in which the locking system (42) comprises:
- at least one base body (48);
- at least one hook (44) movable, optionally via rotation, with respect to the base body (48) and configured to engage at least one locking tooth (43).

In a further aspect in accordance with any one of the preceding aspects, in which the base body (48) has at least one through opening, optionally counter-shaped with respect to the elongated body of the holding element (40b), configured to receive, at least partially in crossing, the elongated body of the holding element (40b).

In a further aspect in accordance with any one of the preceding aspects, in which the hook (44) in the first operating position of the holding element (40b), is disengaged from the locking tooth (43).

In a further aspect in accordance with any one of the preceding aspects, in which the elongated body of the holding element (40b), in the second operating position, is arranged in engagement inside the through opening of the base body (48).

In a further aspect in accordance with any one of the preceding aspects, in which the hook (44) is movable relative to the base body at least between:
- a spaced position in which the hook (44) allows the insertion of the elongated body in the through opening of the base body (48);
- a close position in which the hook (44) engages a locking tooth (43) of the elongated body.

In a further aspect in accordance with any one of the preceding aspects, in which the hook (44), in the close position, is housed inside the seat of the elongated body, configured to prevent the removal of the elongated body from the through opening of the base body (48).

In a further aspect in accordance with any one of the preceding aspects the coupling element (4) comprises a first and a second jaw (4a, 4b) defining a seat (4d) configured to receive the block (F1) of the fastening buckle (F). In a further aspect in accordance with any one of the preceding aspects the first and the second jaw (4a, 4b) are relatively movable with respect to each other at least between:

a spaced position in which the first and the second jaw (4a, 4b) are configured (i.e. disengaged from each other and configured) to allow the positioning of the block (F1) in the seat;

a close position in which the first and the second jaw (4a, 4b) are configured (i.e. engaged to each other and configured) to stably constrain the block (F1), optionally preventing the relative movement between the fastening buckle (F) and the coupling element (4). In a further aspect in accordance with any one of the preceding aspects the control unit is carried by at least one between the first and the second jaw (4a, 4b).

In a further aspect in accordance with any one of the preceding aspects, the anti-abandonment system comprises at least one power supply system, connected to the control unit (50) and configured to electrically power supply the latter. In a further aspect in accordance with any one of the preceding aspects the anti-abandonment system comprises an electric energy accumulator connected to the control unit (50). In a further aspect in accordance with any one of the preceding aspects the electric energy accumulator comprises a battery and/or a supercapacitor. In a further aspect in accordance with any one of the preceding aspects, the electric energy accumulator is electrically connected to at least one power supply system of the anti-abandonment system itself and/or is configured to be connected to a power supply system of the vehicle, for example connected (directly and/or indirectly) to at least one between the control unit of the vehicle, the battery of the vehicle.

In a further aspect in accordance with any one of the preceding aspects the anti-abandonment system (1) is configured to also be connected, by means of a wired circuit, to a power supply of the vehicle. In a further aspect in accordance with any one of the preceding aspects the vehicle comprises an automobile, in which the control unit (50) is configured to be connected by means of wired circuit (optionally directly and/or indirectly) to at least one between the following components of the automobile: the power supply battery, the control unit, the cigarette lighter outlet, a USB outlet.

In a further aspect in accordance with any one of the preceding aspects the second sensor (3) comprises at least one selected in the group between: an infrared optical sensor, a capacitive sensor, a magnetic sensor, an ultrasound transducer, a micro-switch.

In a further aspect in accordance with any one of the preceding aspects the second sensor (3) is an emitter and receiver sensor.

In a further aspect in accordance with any one of the preceding aspects the first sensor (2) comprises at least one selected in the group between: a switch, a button, a micro-button, a micro-switch.

In a further aspect in accordance with any one of the preceding aspects the first sensor (2) is a weight sensor aimed to detect a load resting on a predefined area of the restraining device (R) dedicated to the accommodation of the infant and/or child.

In a further aspect in accordance with any one of the preceding aspects the first sensor (2) is connected by means of a wired circuit to the control unit (50).

In a further aspect in accordance with any one of the preceding aspects the anti-abandonment system (1) comprises a seating device (7) associable with the restraining device (R) and configured to be positioned on a predefined seating area of the restraining device (R) aimed to accommodate the child and/or infant, in which the first sensor (2) is associated with the seating device (7).

In a further aspect in accordance with any one of the preceding aspects the seating device (7) comprises at least one casing (8) inside which is housed said first sensor (2).

In a further aspect in accordance with any one of the preceding aspects the casing (8) of the seating device (7) comprises: at least one base (9), at least one cover (10) engaged with the base (9), in which base (9) and cover (10) are relatively movable with respect to each other between a close position and a spaced position, in which base (9) and cover (10) are configured to be arranged in the close position in the condition in which a child and/or an infant is arranged on the seating device (7) positioned on the predefined seating area of the child and/or infant of the restraining device (R).

In a further aspect in accordance with any one of the preceding aspects the first sensor (2) is interposed between the base (9) and the cover (10), configured to emit the signal representative of the presence of a child and/or an infant on the restraining device (R) in the close position of base (9) and cover (10).

In a further aspect in accordance with any one of the preceding aspects the base (9) and the cover (10) are configured to stably remain in the spaced position.

In a further aspect in accordance with any one of the preceding aspects the casing (8) comprises an external covering (11) comprising at least one padded portion adapted to define a cushion. In a further aspect in accordance with any one of the preceding aspects the padded portion at least partly encloses the base (9) and at least partly encloses the cover (10) of the casing (8).

In a further aspect in accordance with any one of the preceding aspects the anti-abandonment system (1) comprises at least one emitter (6) connected to the control unit (50) and configured to emit at least one among an acoustic signal, a haptic signal and a visual signal. In a further aspect in accordance with any one of the preceding aspects the control unit (50), following the definition of the alarm condition, is configured to command the emitter (6) to emit at least one between said acoustic signal, haptic signal and visual signal. In a further aspect in accordance with any one of the preceding aspects the emitter (6) is associated with the coupling element (4). In a further aspect in accordance with any one of the preceding aspects the first sensor (2) is electronically connected to the control unit (50) by means of:
  at least one wired circuit,
  at least one analog electronic component configured to receive and vary the signal emitted by the first sensor (2),
in which the control unit (50) is configured to:
  receive the signal emitted by the first sensor (2) and varied by the electronic component,
  determine, as a function of the signal emitted by the first sensor (2), the presence of a child and/or an infant on the restraining device (R).

In a further aspect in accordance with any one of the preceding aspects the anti-abandonment system comprises:
  a printed circuit displaced in the casing (8) between the base (9) and the cover (9),
  the at least one first sensor (2) connected to the printed circuit,
in which the printed circuit is connected by means of the wired circuit to the control unit which is then connected to the at least one first sensor (2).

In a further aspect in accordance with any one of the preceding aspects the at least one sensor (2) comprises a plurality of switches connected to the printed circuit and interposed between the base (9) and the cover (10) of the casing (8).

In a further aspect in accordance with any one of the preceding aspects the control unit (50) comprises:
- at least one electronic board,
- at least one microprocessor connected to the electronic board, in which the first and the second sensor (2, 3) are connected to the electronic board of the control unit (50) which is configured to transmit the respective signals to the microprocessor, which is configured to perform the control procedure.

In a further aspect in accordance with any one of the preceding aspects, the electronic board is connected to a power supply of the vehicle.

In a further aspect in accordance with any one of the preceding aspects, in which the control unit (50) is configured to:
- receive a starting signal emitted by the vehicle,
- determine a driving condition of the vehicle by means of the reception of the starting signal.

In a further aspect in accordance with any one of the preceding aspects, in which the control unit (50) is configured to command the emitter (6) to reproduce a specific acoustic signal indicative of a predetermined condition detected by the control unit.

In a further aspect in accordance with the preceding aspect, the control unit (50) is configured to command the emitter (6) to reproduce a specific acoustic signal in relation to one or more of the following predetermined conditions:
- presence of a child and/or an infant on the restraining device (R),
- activation of the car power supply,
- the fastened condition of the safety belt (driver's seat belt inserted),
- the unfastened condition of the safety belt (driver's seat belt not inserted when the car is powered),
- lifting child with engine running (while driving),
- engine power off,
- safety belt release (driver),
- lifting child with engine off.

said specific acoustic signal being different in relation to different predetermined conditions.

In a further aspect in accordance with any one of the preceding aspects, in which the emitter (6) is configured to reproduce a plurality of acoustic signals that are at least partially different from each other, optionally each acoustic signal has an at least partially different frequency spectrum, or a different amplitude or a sequence of different sounds.

For example, a plurality of different sound pulses could be emitted for each predetermined condition, such as one beep for child presence, two beeps for fastened belt, etc. . . . ; or the sounds can have tone or amplitudes that are different so they can be automatically recognized by a listening device by means of microphone.

In a further aspect in accordance with any one of the preceding aspects, in which the control unit (50) is configured to command the emitter (6) to reproduce an acoustic signal that is specific and distinguishable from the others, for each from among the active condition, the deactivated condition, the alarm condition, the inactivity condition and the driving condition.

In a further aspect in accordance with any one of the preceding aspects the control unit (50) comprises at least one power supply system, optionally a battery and/or a supercapacitor, configured to electrically power supply the microprocessor of the control unit (50).

In a further aspect in accordance with any one of the preceding aspects the coupling element (4) comprises a respective casing defining a compartment, in which the electronic board, the microprocessor, optionally the battery and/or the supercapacitor, of the control unit are housed inside the compartment of the casing of the coupling element (4).

In a further aspect in accordance with any one of the preceding aspects, in which the coupling element (4) comprises at least one deactivation button (70) connected to the control unit (50) and configured to emit a predetermined number of command signals to send to said control unit (50) in order to command a temporary deactivation condition to the latter.

In a further aspect in accordance with any one of the preceding aspects, in which the control unit (50) is configured to:
- receive the command signals emitted by the deactivation button (70),
- define the temporary deactivation condition during which the control unit (50) is configured to not perform the control procedure and/or to not emit and/or send alarm signals.

In a further aspect in accordance with any one of the preceding aspects, in which the temporary deactivation condition has a duration comprised between 1 s and 600 s, optionally comprised between 30 s and 300 s, e.g. 60 s.

In a further aspect in accordance with any one of the preceding aspects, in which each command signal emitted by the deactivation button (70) is representative of a value of minimal time duration of the temporary deactivation condition, said minimum duration value being equal for example to 30 s.

In a further aspect in accordance with any one of the preceding aspects, in which the duration of the deactivation condition is selectable by an external user following the actuation, also repeated, of the deactivation button (70). In a further aspect in accordance with any one of the preceding aspects, in which the deactivation button (70) is configured to emit a command signal representative of the minimum duration value of the deactivation condition for each activation of the deactivation button (70).

In a further aspect in accordance with any one of the preceding aspects, in which the control unit (50) comprises at least one memory buffer which, following the reception of the command signal, is configured to store at least one duration value of the temporary deactivation condition.

In a further aspect in accordance with any one of the preceding aspects, in which the control unit (50) is configured to receive a plurality of command signals, said buffer being configured to store, following the reception of said plurality of command signals, a sum of each minimum duration value.

In a further aspect in accordance with any one of the preceding aspects, in which the control unit (50), during the temporary deactivation condition, is configured to emit a threshold signal equal to the sum of the minimum duration values stored in the buffer.

In a further aspect in accordance with any one of the preceding aspects, in which the anti-abandonment system comprises at least one timer (71) connected to the control unit (50) and configured to detect the threshold signal emitted by the control unit (50).

In a further aspect in accordance with any one of the preceding aspects, in which the timer, following the detection of the threshold signal, is configured to perform a count procedure comprising the steps of:
increasing a count value,
comparing said count value with the threshold signal,
emitting a timeout signal following the verification of the equivalence between the count value and the threshold signal,
resetting the count value.

In a further aspect in accordance with any one of the preceding aspects, in which the timeout signal is representative of the end of the temporary deactivation condition.

In a further aspect in accordance with any one of the preceding aspects, in which the control unit (50), following the detection of the command signal, is configured to:
detect the timeout signal emitted by the timer (71),
execute the control procedure following the reception of the timeout signal (71).

In a further aspect in accordance with any one of the preceding aspects the anti-abandonment system comprises:
at least one acoustic indicator connected to the control unit (50) and configured to emit at least one acoustic signal,
at least one mobile device, optionally configured to:
detect said acoustic signal,
following the detection of said acoustic signal, determine a hazardous condition,
following the determination of the hazardous condition, emitting a warning signal,
in particular in which the control unit (50) is configured to command the acoustic indicator to emit the acoustic signal following the determination of the alarm condition.

In a further aspect in accordance with any one of the preceding aspects the movable control device comprises a smartphone, optionally connectable to the control unit (50) by means of a connector of USB type.

In a further aspect in accordance with any one of the preceding aspects the anti-abandonment system comprises at least one temperature sensor, e.g. a thermistor, configured to send a signal representative of the temperature present inside the vehicle,
in which the control unit (50) is connected (e.g. by means of wired circuit) to the temperature sensor and configured to determine, as a function of the signal emitted by said temperature sensor, the temperature present in the vehicle and determine an alarm condition in the event that:
the control unit determines the presence of the child and/or infant on the restraining device;
the control unit determines a temperature inside the vehicle that is above a predetermined threshold.

In a further aspect in accordance with any one of the preceding aspects the control unit 50 is configured in order to define the alarm condition independent of the determination of the fastened or unfastened condition of the safety belt of the driver.

In a further aspect in accordance with any one of the preceding aspects, in which the mobile device (100) comprises:
at least one internal memory (102) configured to store at least one reference signal,
at least one microphone (101) configured to detect at least one acoustic signal;
at least one control unit (90) connected to the internal memory (102) and to the microphone (101), configured to perform an acoustic signal recognition procedure and recognize the signal received, following the recognition, the control unit (90) being configured to assign a specific predetermined condition that has occurred.

In a further aspect in accordance with the preceding aspect, the recognition procedure comprises the steps of:
sampling the acoustic signal detected by the microphone,
comparing the signal sampled with the reference signal,
emitting the warning signal representative of the occurred recognition of the acoustic signal.

In a further aspect in accordance with any one of the preceding two aspects, the specific predetermined condition that has occurred is one of the following:
presence of a child and/or an infant on the restraining device (R),
activation of the car power supply,
the fastened condition of the safety belt (driver's seat belt inserted),
the unfastened condition of the safety belt (driver's seat belt not inserted when the car is powered),
lifting child with engine running (while driving),
engine power off,
safety belt release (driver),
lifting child with engine off.

In a further aspect in accordance with any one of the preceding aspects, in which the step of comparing the sampled signal with the reference signal provides for the following steps:
determining a frequency signal of the sampled signal,
determining a respective frequency signal of the reference signal,
comparing the frequency signal of the sampled signal with the frequency signal of the reference signal.

In a further aspect in accordance with any one of the preceding aspects, in which the step of comparing the frequency signal of the sampled signal with the frequency signal of the reference signal, provides for the following sub-steps:
determining a temporary signal equal to the difference between the frequency signal of the sampled signal and the frequency signal of the reference signal,
comparing the temporary signal with a predetermined interval of frequencies.

In a further aspect in accordance with any one of the preceding aspects, in which the control unit (90) of the mobile device is configured to perform the step of comparing the frequency signal of the sampled signal with a frequency signal of the reference signal, so that the temporary signal has frequencies comprised inside the predetermined interval of frequencies.

In a further aspect in accordance with any one of the preceding aspects, in which the mobile device comprises at least one auxiliary emitter (60) directly connected to the control unit (90) of the mobile device, configured to:
receive the warning signal emitted by the control unit (90) of the mobile device,
reproduce at least one among an acoustic signal, haptic signal and visual signal.

In a further aspect in accordance with any one of the preceding aspects, in which the auxiliary emitter (60) comprises at least one display which, following the reception of the warning signal, is configured to give proof to an external user of occurred recognition of the sampled signal.

In a further aspect in accordance with any one of the preceding aspects, in which the internal memory is configured to store a plurality of reference signals, each of which associable with a previously-sampled acoustic signal.

In a further aspect in accordance with any one of the preceding aspects, in which each reference signal of said plurality corresponds to a respective acoustic signal reproducible by the emitter (6).

In a further aspect in accordance with any one of the preceding aspects, in which the mobile device (100) comprises at least one GPS module, directly connected to the control unit (90) of the mobile device and configured to emit at least one location signal representative of the position of the mobile device.

In a further aspect in accordance with any one of the preceding aspects, in which the internal memory is configured to store a predetermined number of points of interest, each of which representative of a predetermined geographic position which the mobile device can reach.

In a further aspect in accordance with any one of the preceding aspects, in which the GPS module is configured to emit a plurality of location signals representative of a route traveled by the mobile device.

In a further aspect in accordance with any one of the preceding aspects, in which the control unit (90) of the mobile device is configured to perform a procedure of detection of the mobile device comprising the steps of:
  detecting at least one location signal,
    comparing said location signal con each point of interest stored in the internal memory,
    emitting a signal of occurred location representative of the correspondence between a location signal emitted by the GPS module with a point of interest stored in the internal memory.

In a further aspect in accordance with any one of the preceding aspects, in which the auxiliary emitter (60) is configured to receive the signal of occurred location emitted by the control unit (90) of the mobile device, said auxiliary emitter (60) also being configured to reproduce at least one among an acoustic signal, haptic signal and visual signal following the lack of reception of the signal of occurred location.

In a further aspect in accordance with any one of the preceding aspects, in which the anti-abandonment system comprises a plurality of movable devices (100) interconnected with each other to define a network of movable devices (100), each of said movable devices being configured to perform a respective procedure of detection of the mobile device.

In a further aspect in accordance with any one of the preceding aspects, in which the movable devices are interconnected with each other by means of an internet connection.

In a further aspect in accordance with any one of the preceding aspects, in which each mobile device of said plurality is configured to send the signal of occurred location to each mobile device belonging to the network of movable devices.

In a further aspect in accordance with any one of the preceding aspects, in which the auxiliary emitter (60) of a respective mobile device of the network of movable devices, following the lack of detection of a signal of occurred location emitted by a mobile device of the network, is configured to reproduce at least one among an acoustic signal, a haptic signal and a visual signal.

In a further aspect, an application is provided for an anti-abandonment system which, when loaded on a device, configures it in order to perform the following steps:
  sampling at least one acoustic signal,
  comparing the sampled signal with a reference signal.
  emitting a command signal representative of the occurred recognition of the acoustic signal.

In a further aspect, a process is provided for warning of a potentially hazardous situation relative to the presence of an infant/child inside a vehicle, said process using an anti-abandonment system in accordance with any one of the preceding aspects. In a further aspect in accordance with the preceding aspect the process comprises the following steps:
  arranging the first sensor (2) on a restraining device (R) housed in the vehicle,
  engaging the second sensor (3) with only one between the fastening buckle (F) and the fastening tab (L) of a safety belt of the vehicle,
  performing a control procedure comprising:
    determining, as a function of the signal emitted by the first sensor (2), the presence of a child and/or an infant on the restraining device (R),
    determining, as a function of the signal emitted by the second sensor (3), the fastened condition of the unfastened condition of the safety belt of the driver,
    defining an alarm condition if the presence of a child and/or an infant on the restraining device is determined, and at the same time the unfastened condition of the safety belt of the driver is determined.

In a further aspect in accordance with any one of the preceding aspects during the performance of the control procedure, the alarm condition is defined, during the determination of the presence of a child and/or an infant on the restraining device (R), following the determination of the passage from the fastened condition to the unfastened condition of the safety belt of the driver.

In a further aspect in accordance with any one of the preceding aspects the step of determining the presence of a child and/or an infant on the restraining device (R) comprises the following sub-steps of:
  positioning a child and/or an infant on the first sensor (2) housed on the restraining device (R),
  sending, by the first sensor (2), a signal representative of the presence of a child and/or an infant on the restraining device (R),
  receiving, by the control unit (50), the signal of the first sensor (2),
  determining, as a function of the signal, of the presence of a child and/or an infant on the restraining device (R).

In a further aspect in accordance with any one of the preceding aspects the process is configured to perform the control procedure only following the determination of the presence of a child and/or an infant on the restraining device and the determination of the fastened condition of the safety belt of the driver.

In a further aspect in accordance with any one of the preceding aspects the restraining device (R) comprises at least one between: a child seat for children, a pod for infants.

In a further aspect in accordance with any one of the preceding aspects the steps of the control procedure of the signaling process are performed by the control unit (50) of the anti-abandonment system.

In a further aspect, a method is provided for installing an anti-abandonment system in accordance with any one of the preceding aspects, said method comprising the steps of:
  positioning the first sensor (2) on a predefined area of the restraining device (R) dedicated to the accommodation of the infant and/or child,
  engaging the second sensor (3) with only one between the fastening buckle and the fastening tab of the safety belt.

In a further aspect a process is provided for recognizing an acoustic signal, using an anti-abandonment system in accordance with any one of the preceding aspects.

In a further aspect in accordance with the preceding aspect, the process comprises the following steps:
  sampling an acoustic signal reproduced by an emitter (6),
  comparing the sampled signal with a reference signal, emitting the warning signal representative of the occurred recognition of the acoustic signal.

In a further aspect in accordance with any one of the preceding aspects, in which the step of comparing the sampled signal with the reference signal provides for the following steps:
determining a frequency signal of the sampled signal,
determining a respective frequency signal of the reference signal,
comparing the frequency signal of the sampled signal with the frequency signal of the reference signal.

In a further aspect in accordance with any one of the preceding aspects, in which the step of comparing the frequency signal of the sampled signal with the frequency signal of the reference signal, provides for the following sub-steps:
determining a temporary signal equal to the difference between the frequency signal of the sampled signal and the frequency signal of the reference signal,
comparing the temporary signal with a predetermined interval of frequencies.

In a further aspect in accordance with any one of the preceding aspects, in which the step of emitting the warning signal provides for the sub-step of commanding an auxiliary emitter (60) configured to reproduce at least one among an acoustic signal, haptic signal and visual signal.

In a further aspect in accordance with any one of the preceding aspects, the process comprises a step of storing a plurality of acoustic signals representative of at least one from among an active condition, a deactivated condition, an alarm condition, an inactivity condition and a driving condition.

In a further aspect in accordance with any one of the preceding aspects, in which the step of emitting the warning signal provides for commanding the auxiliary emitter (60) to reproduce at least one from among an acoustic signal, a haptic signal, a visual signal, representative of the occurred recognition of the sampled signal.

In a further aspect a process is provided for detecting a location signal, using a mobile device of an anti-abandonment system in accordance with any one of the preceding aspects.

In a further aspect in accordance with the preceding aspect, the process comprises a step of storing a plurality of points of interest, each of which representative of a predetermined geographic position that the mobile device can reach.

In a further aspect in accordance with any one of the preceding aspects, in which the process comprises a step of emitting a location signal representative of a route traveled by the mobile device.

In a further aspect in accordance with any one of the preceding aspects, in which the process comprises a step of performing a procedure of detection of the mobile device comprising the steps of:
detecting at least one location signal,
comparing said location signal with each point of interest stored in the internal memory,
emitting a signal of occurred location representative of the correspondence between a location signal emitted by the GPS module with a point of interest stored in the internal memory.

In a further aspect in accordance with any one of the preceding aspects, in which the process comprises a step of reproducing at least one among an acoustic signal, haptic signal and visual signal following the lack of reception of the signal of occurred location.

BRIEF DESCRIPTION OF THE DRAWINGS

Several embodiments and several aspects of the finding will be described hereinbelow with reference to the enclosed drawings, provided only as a non-limiting example in which.

DEFINITIONS AND CONVENTIONS

Figure 1:
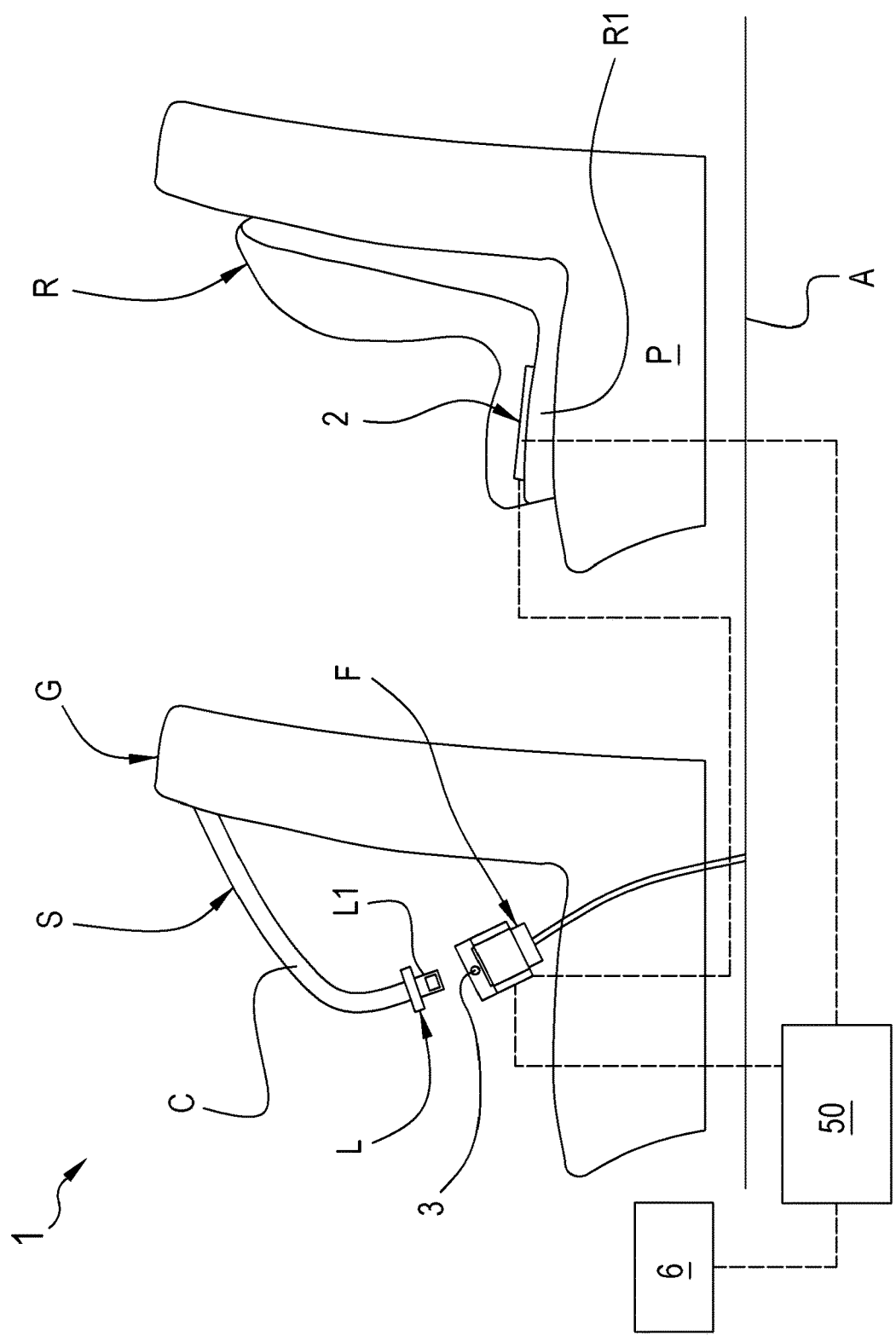
FIG. 1 is a schematic view of an anti-abandonment system in accordance with the present invention associated with a car.

It is observed that in the present detailed description, corresponding parts illustrated in the various figures are indicated with the same reference numbers. The figures could illustrate the object of the invention by means of representations that are not in scale; therefore, parts and components illustrated in the figures relative to the object of the invention might only regard schematic representations.

With the term 'vehicle' it is intended a mechanical means driven by a man assigned to transport people by road, for example defined by a car, an off-road vehicle, a van, a truck or any one other vehicle for transporting people with three or more wheels, provided with safety belts S for the driver (i.e. associated with a driver front seat G) and at least one seat P for mounting a child seat for children and/or infants.

With the term 'webbing' C of the safety belt S it is intended the flexible element of the safety belt designed to restrain the body of the driver.

With the term 'fastening buckle' F of the safety belt S it is intended the fastening or unfastening device adapted to allow the engagement of the webbing S with an anchorage point A of the vehicle, i.e. a point of attachment on the structure of the vehicle.

With the term 'fastening tab' L of the safety belt S it is intended the instrument stably carried by the webbing C and configured to be stably engaged with the fastening buckle F of the safety belt S. In fact, the tab and the fastening buckle of the safety belt are the instruments which cooperate in order to allow the engagement of the webbing C with the anchorage point A of the vehicle.

With the term 'restraining device' R it is intended a care safety device associable with a seat of a vehicle and adapted to define a seat for a child or an accommodation for an infant. The restraining device was designed in order to prevent collisions and impact for children and infants in case of driving accident. The restraining device R can be defined by a pod for transporting infants or a child seat for transporting children.

Control Unit

The safety system described and claimed herein comprises at least one control unit set for controlling operating conditions implemented by the same safety system. The control unit can be a single unit or be formed by a plurality of separate control units depending on the design selections and on the operating requirements. With the term control unit it is intended a component of electronic type, which can comprise at least one from among: a digital processor (CPU), a circuit of analog type, or a combination of one or more digital processors with one or more circuits of analog type. The control unit can be "configured" or "programmed" for performing several steps: this can be attained in practice with any means which allows configuring or programming the control unit. For example, in the case of a control unit comprising one or more CPUs and one or more memories, one or more programs can be stored in suitable memory banks connected to the CPU or to the CPUs; the program or programs contain instructions which, when executed by the CPU or by the CPUs, program or configure the control unit in order to perform the operations described in relation to the control unit. Alternatively, if the control unit is or comprises circuitry of analog type, then the circuit of the control unit can be designed to include circuitry configured, during use, to process electrical signals in a manner such to perform the steps relative to the control unit.

DETAILED DESCRIPTION

Anti-Abandonment System

Reference number 1 overall indicates an anti-abandonment system for warning of a potentially hazardous situation relative to the presence of an infant/child inside a vehicle. The anti-abandonment system 1 can be easily installed on any one car and on any restraining device R (e.g. a child seat or a pod) for a child and/or an infant. In particular, as will be better described hereinbelow, the anti-abandonment system is associable, on one side, with a restraining device R and, on the other side, with the safety belt S of the driver of a vehicle (automobile). For better comprehension of the structure and operation of the anti-abandonment system 1, a brief description of the components of the safety belt S and of the restraining device R is reported. With regard to the restraining device R, this comprises a predefined seating or abutment area R1 dedicated to the accommodation of the infant and/or child; the restraining device R is generally fixed to passenger seats P, generally but not necessary rear, of the vehicle by means of at least one safety belt or it can be directly fixed to the structure of the vehicle by means of the international standardized fixing system, isofix. With regard instead to the safety belt S, as is known, this is constituted by a fastening buckle F associated with an anchorage point A of the vehicle: the fastening buckle F comprises a block F1 having a compartment F3 inside which a locking mechanism is housed F4 configured to receive in engagement an inserting portion L1 of a fastening tab L. In detail, the block F1 comprises a slot F2 configured to allow the insertion of the inserting portion L1 of the fastening tab L in the compartment F3 for housing the block F1 in order to allow the engagement of said fastening tab L with the locking mechanism F4 of the fastening buckle F. The fastening tab L is stably carried by a webbing C designed to restrain the body of the driver.

In detail, the fastening buckle F is configured to cooperate with the fastening tab L in order to define:
  at least one fastened condition of the safety belt during which the fastening tab L and the fastening buckle F are stably engaged with each other,
  at least one unfastened condition of the safety belt during which the fastening tab L and the fastening buckle F are uncoupled.

The anti-abandonment system 1 comprises at least one first sensor 2 associable with a restraining device R and configured to emit a signal representative of the presence or not of a child and/or an infant on the restraining device R. In detail, the first sensor 2 comprises at least one switch or micro-switch or button or a weight sensor configured to detect the presence and/or the weight of the child and/or infant resting on a predefined area of the restraining device R dedicated to the accommodation of the infant and/or child.

Figure 10:
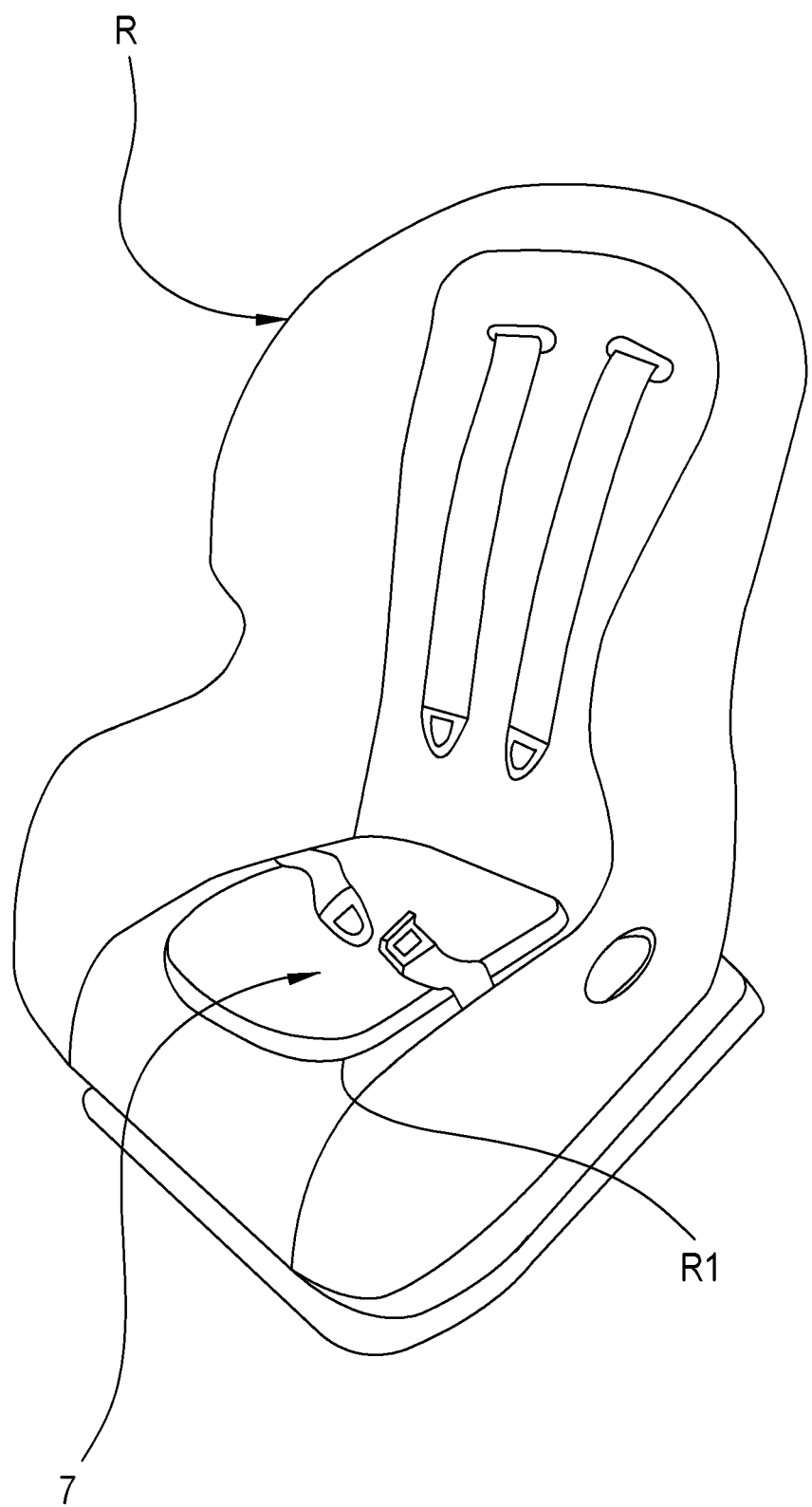
FIG. 10 shows a first sensor of the anti-abandonment system in accordance with the present invention associated with a child seat for a child, destined for use on a car.
Figure 11:
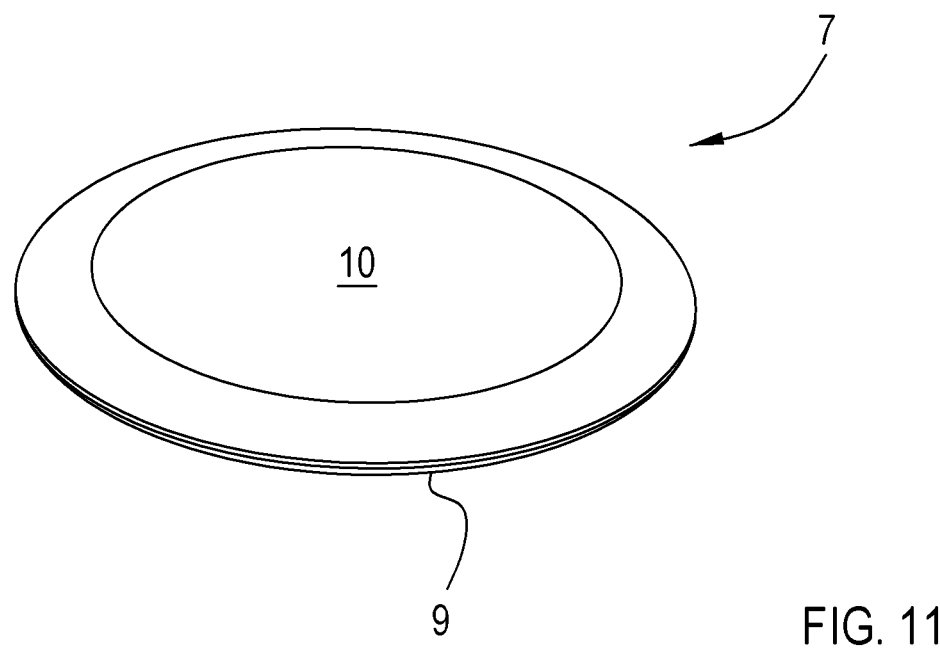
FIG. 11 is a perspective view of a seating device carrying the first sensor of the anti-abandonment system in accordance with the present invention.
Figure 12:
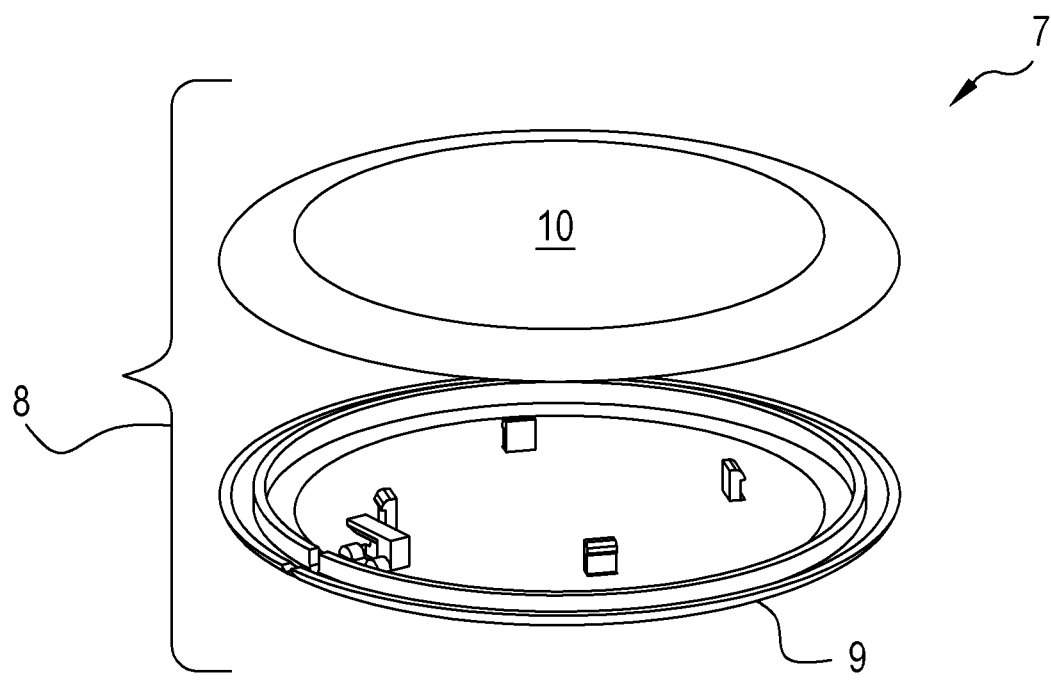
FIG. 12 is an exploded schematic view of several components of the seating device of the anti-abandonment system.

In detail, the anti-abandonment system 1 comprises a seating device 7, schematically illustrated in FIG. 10, placed in abutment against the predefined area of accommodation of the child and/or infant of a child seat. The seating device is then associable with the restraining device R and configured to be positioned on a predefined seating area of the restraining device R aimed to accommodate the child and/or infant; the first sensor 2 is associated with the seating device 7 in a manner such that following the positioning of the child and/or infant on the predefined area of the restraining device R, the first sensor 2 can be actuated in a manner such that the sensor 2 can send a signal representative of the presence of the child and/or infant on the restraining device R. In still more detail, the seating device 7 comprises a casing 8 in turn having at least one base 9 and at least one cover 10 engaged with the base 9. The base 9 and cover 10 are relatively movable with respect to each other between a close position and a spaced position. In detail, the base 9 and the cover 10 are configured to stably remain in the spaced position: base 9 and cover 10 are configured to be arranged in the close position in the condition in which a child and/or an infant is arranged on the seating device 7 positioned on the predefined seating area of the child and/or infant of the restraining device R. The first sensor 2—for example comprising a switch or a button—is interposed between the base 9 and the cover 10 (see for example FIGS. 13 and 14) and is configured to emit the signal representative of the presence of a child and/or an infant on the restraining device R in the close position of base 9 and cover 10.

Figure 13:
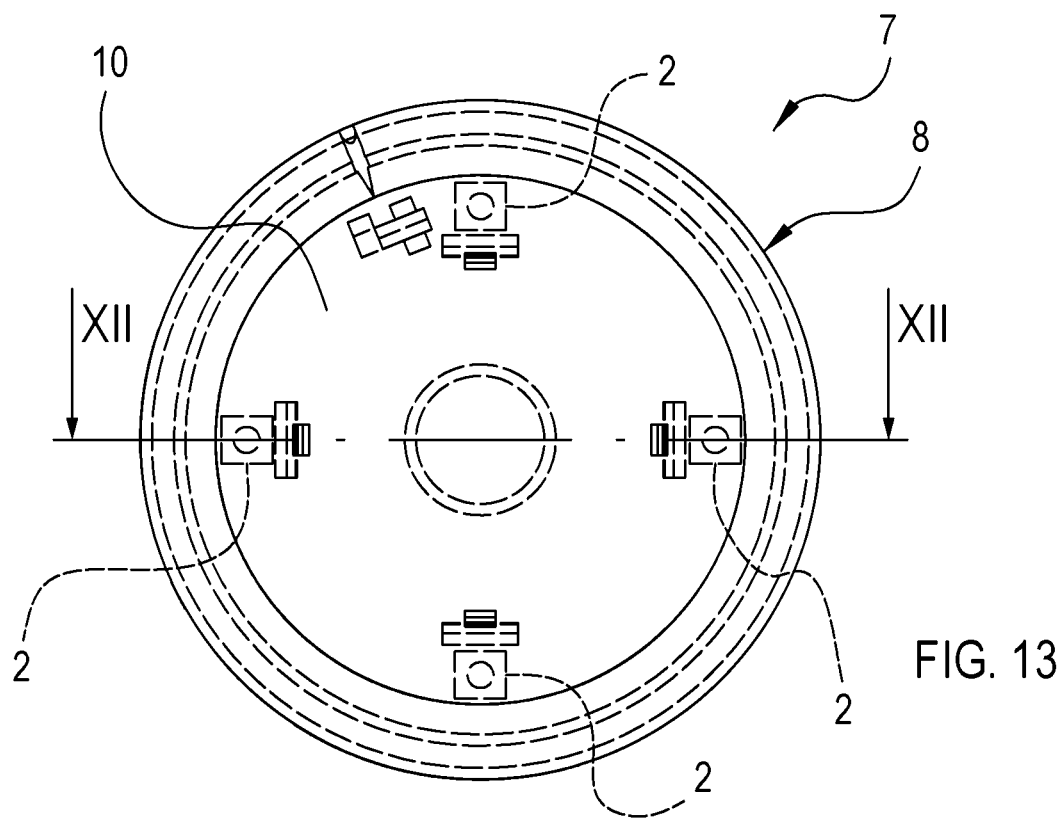
FIG. 13 is a top view of a seating device of the anti-abandonment system in accordance with the present invention.
Figure 14:
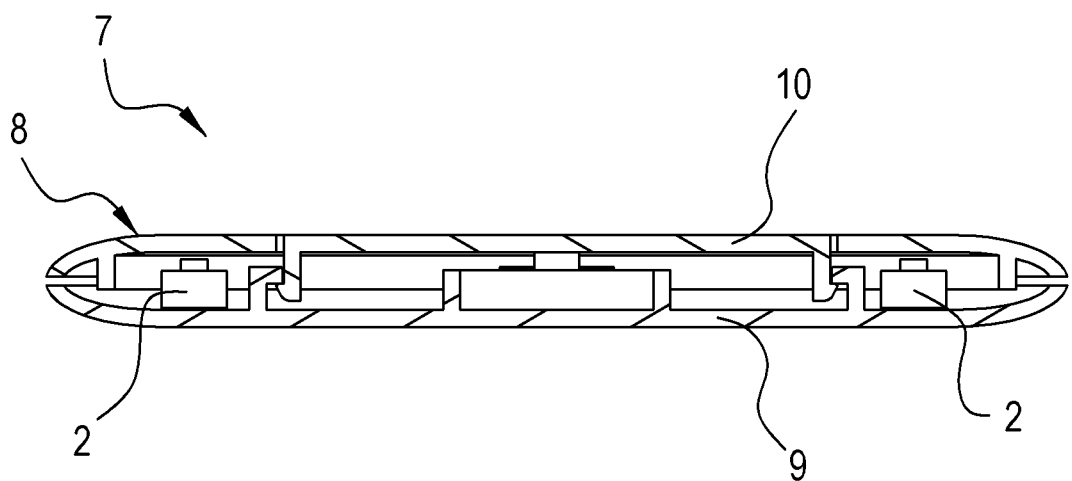
FIG. 14 is a sectional view, according to the trace XII-XII, of the seating device of FIG. 11.
Figure 15:
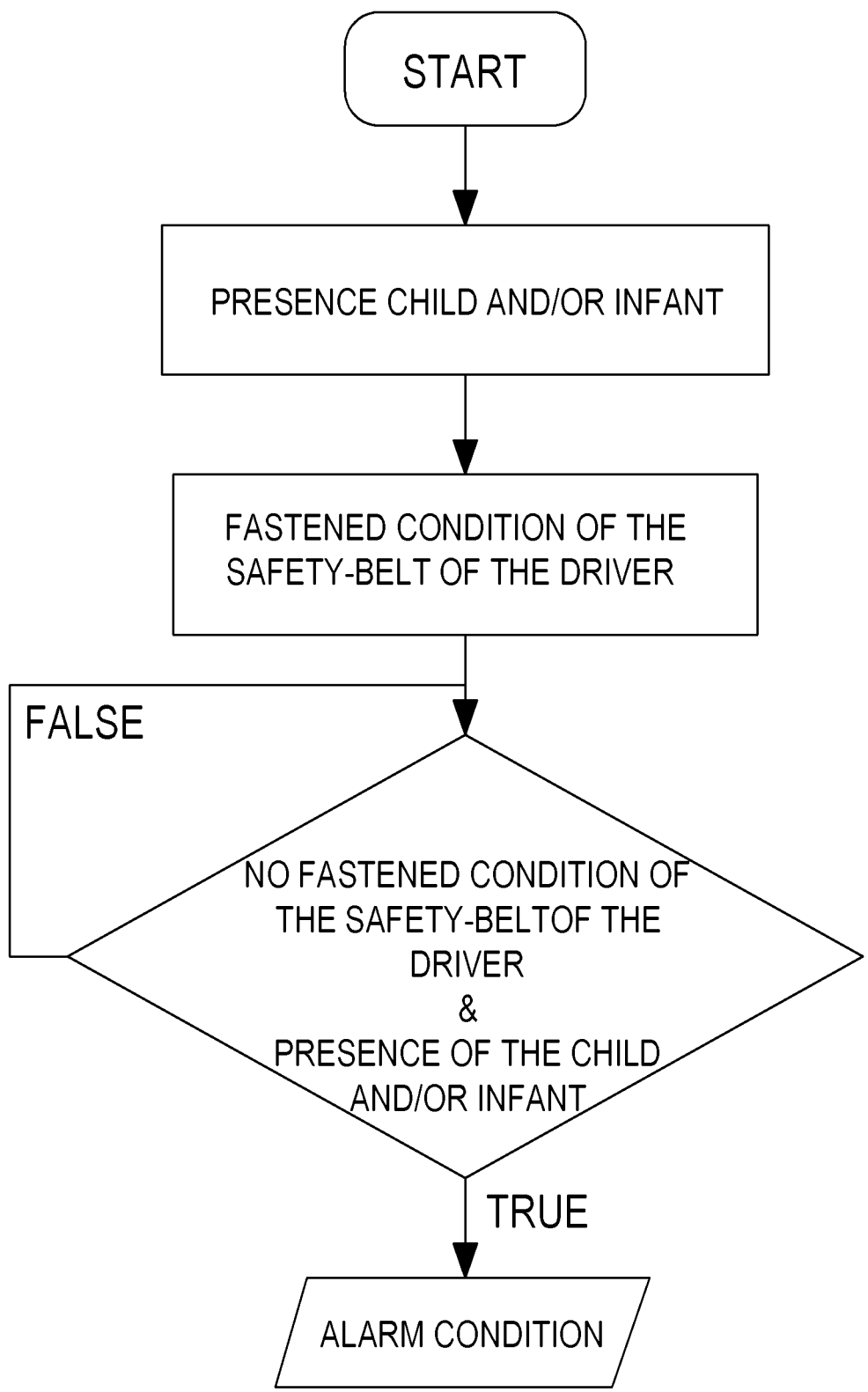
FIG. 15 is a flow diagram that can be implemented by a control unit of the anti-abandonment system in accordance with the present invention.

In fact, when the child and/or infant is rested on the seating device 7, the weight of the child exerts a thrust action on the seating device 7 which allows the base 9 and the cover 10 to pass from the stable spaced position to the close position: the thrust action of the child (or infant) generates the relative approaching movement of base 9 and cover 10 which is detected by the first sensor 2 which, in such condition, is configured to send the signal representative of the presence of a child and/or an infant on the restraining device R. The casing 8 can comprise an external covering comprising at least one padded portion adapted to define a cushion; the padded portion at least partially encloses the base 9 and at least partially encloses the cover 10 of the casing 8 such to define a comfortable seat for the child and/or infant. The anti-abandonment system 1 can comprise only one first sensor 2 or a plurality of first sensors 2 as illustrated in FIGS. 13 and 14. For example, one or more of said first sensors 2 can be associated with a seating device 7 and for example housed inside the casing 8 in a manner such to be able to effectively detect one or more relative displacements between base 9 and cover 10 of the casing 8. Of course, it may also be possible to equip the anti-abandonment system with two or more seating devices 7 such that the anti-abandonment system can be associated with multiple child seats and/or pods arranged inside the vehicle; each of said seating devices can be associated with one or more of said first sensors 2. In detail, each of the seating devices 7 of the anti-abandonment system 1 comprises a plurality of first sensors placed in interposition between the base 9 and the cover 10 of the casing 8, as is illustrated schematically in FIG. 14. In detail, each seating device 7 can comprise a printed circuit placed inside the casing 8 and to which the at least one first sensor 2 (optionally the plurality of first sensors 2) is connected. Analog electronic components can also be provided, for example one or more electrical resistors, connected to the printed circuit and to the at least one first sensor 2: the analog components are configured to receive the signal emitted by the first sensor and vary it in the desired manner. For example, such analog components can filter and modulate the signal of the first sensor 2.

The first sensor 2 can be electronically power supplied by a battery and/or a supercapacitor, e.g. connected to the printed circuit. Alternatively or additionally, the first sensor 2 is configured to be electrically connected to a power supply source of the vehicle, for example to the control unit or to the battery of a car. In a further alternative, the first sensor 2 can be power supplied by the control unit 50. In the latter two described configurations, the anti-abandonment system can still be provided with a battery and/or a supercapacitor connected to the first sensor (e.g. by means of the printed circuit): the battery and/or the supercapacitor can act as electric energy accumulators in a manner such that, in the absence of power supply by the vehicle and/or by the control unit 50, the first sensor can still be electrically power supplied and have an autonomy sufficient for generating and sending the signal to the control unit. The anti-abandonment system 1 also comprises a control unit 50, schematized in FIG. 1, connected to the first sensor 2. The control unit 50 is configured to receive the signal emitted by the first sensor 2, processing it, and determining (as a function of said signal) the presence of a child and/or an infant on the restraining device R. The first sensor 2 can be connected by means of a wired circuit to the control unit 50; nevertheless, it may be possible to use a wireless transmission system (e.g. Bluetooth or Wi-Fi) for transmitting the signal emitted by the first sensor 2 to the control unit 50. The first sensor 2 can be connected directly to the control unit 50; alternatively, the first sensor 2 is connected to the printed circuit which is in turn connected by means of wired circuit to the control unit 50. As specified above, at least one analog electronic component can be associated with the printed circuit and placed in connection interposition between the first sensor and the control unit: the analog electronic component is configured to receive and vary the signal emitted by the first sensor 2. The control unit 50 is configured to receive the signal emitted by the first sensor 2 and varied by the analog electronic component and determine, as a function of the signal emitted by the first sensor 2, the presence of a child and/or an infant on the restraining device R. The control unit 50 can be configured to receive the signal emitted by the first sensor 2 and varied by the analog component such to be able to determine, for example: the number of first sensors 2 present, the number of first sensors 2 actuated, identify the first sensor actuated, identify the number of seating devices 7, the number of seating devices actuated, identify which seating device has been actuated. Of course it may be possible to arrange, inside each seating device, a digital electronic board provided with microprocessor and connected to the first sensors 2; the microprocessor is configured to process the signal received by the first sensors and send a digital signal to the control unit 50 which can be configured to process said electronic signal for the determination of the presence of a child and/or an infant on the restraining device. Of course, also in the event that there is a digital electronic board, the control unit 50 can be configured to determine, for example: the number of first sensors 2 present, the number of first sensors 2 actuated, identify the first sensor actuated, identify the number of seating devices 7, the number of seating devices actuated, identify which seating device was actuated. In the event that there is a printed circuit or a digital electronic board, these can be power supplied by a battery 5 arranged in the casing 8 or they can be connected, by means of wired circuit, to a power supply source of the vehicle, for example to the control unit or to the battery of a car or to the control unit 50. Alternatively, the anti-abandonment system can comprise a battery 5 or a backup supercapacitor placed inside the casing and connected to the first sensor 2, optionally to the printed circuit or to the digital electronic board, and at the same time have a wired connection circuit that connects the first sensor 2, optionally to the printed circuit or to the digital electronic board, to a power supply source of the vehicle, e.g. to the control unit or to the battery of a car. In this manner, the power supply is mainly provided by the car, when turned on, while the battery or the supercapacitor possibly power supply the first sensor 2 when the car is turned off.

As is visible for example in FIG. 1, the anti-abandonment system 1 also comprises at least one second sensor 3 associable with the safety belt S of the driver of the vehicle. The second sensor 3 is configured to emit a signal representative of a fastened or unfastened condition of the safety belt S of the driver. Also the second sensor 3 is connected to the control unit 50 which is configured to determine, as a function of the signal emitted by the second sensor 3, the fastened condition or the unfastened condition of the safety belt S. The control unit 50 is configured in order to define an alarm condition in the event that the control unit 50 itself determines the presence of a child and/or an infant on the restraining device R and at the same time the unfastened condition of the safety belt S of the driver. Actually, the control unit is configured to implement a control procedure during which the unit 50 is configured to:

determine, as a function of the signal emitted by the first sensor 2, the presence of a child and/or an infant on the restraining device R, determine, as a function of the signal emitted by the second sensor 3, the fastened condition or the unfastened condition of the safety belt, define an alarm condition in the event that the control unit 50 determines the presence of a child and/or an infant on the restraining device and at the same time the unfastened condition of the safety belt of the driver.

In detail, the control unit, during the performance of the control procedure, is configured in order to define the alarm condition if the same control unit 50 determines the passage from the fastened condition to the unfastened condition of the safety belt S of the driver, during the determination of the presence of a child and/or an infant on the restraining device R.

The control unit 50 can have an active condition following the simultaneous determination of the presence of a child and/or an infant on the restraining device R and the determination of the fastened condition of the safety belt of the driver: the control unit 50, during the active condition, is configured to perform said control procedure adapted to define the alarm condition. The control unit can also have a deactivated condition, during which the same is not configured to perform the control procedure; the deactivated condition is defined in the event that the presence of a child and/or an infant is not determined by the control unit on the restraining device R.

Indeed, due to the active or deactivated condition, the control unit 50 is capable of excluding situations in which it is not necessary to carry out the control procedure, for example in the absence of children and/or infants in the vehicle. The deactivated condition of the control unit 50 can also be commanded by a deactivation button connected to the control unit 50: the button is configured to emit a command signal to send to said control unit 50 in order to command the temporary deactivation condition to the latter. For example, the temporary deactivation of the control unit 50 can be useful if it is necessary to make a temporary stop, for example for refueling the car, for which it is not required to execute the control procedure for warning of a potentially hazardous situation.

As is visible from the enclosed figures, the second sensor 3 is associable with only one between said fastening tab L and said fastening buckle F of the safety belt S of the driver, while on the other between said fastening buckle F and said fastening tab L, the second sensor 3 is not present. In other words, the second sensor is associated with only one between the fastening buckle and the fastening tab of the belt, such that on the other between said tab and fastening buckle there is no component of the second sensor 3. The second sensor 3 is distinct from the safety belt S and it is the only component of the anti-abandonment system dedicated to emitting the signal representative of the fastened condition or of the unfastened condition of the safety belt. On the other hand, the control unit 50 is configured to determine the fastened or unfastened condition of the safety belt only by means of the signal emitted by the second sensor 3.

Figure 2:
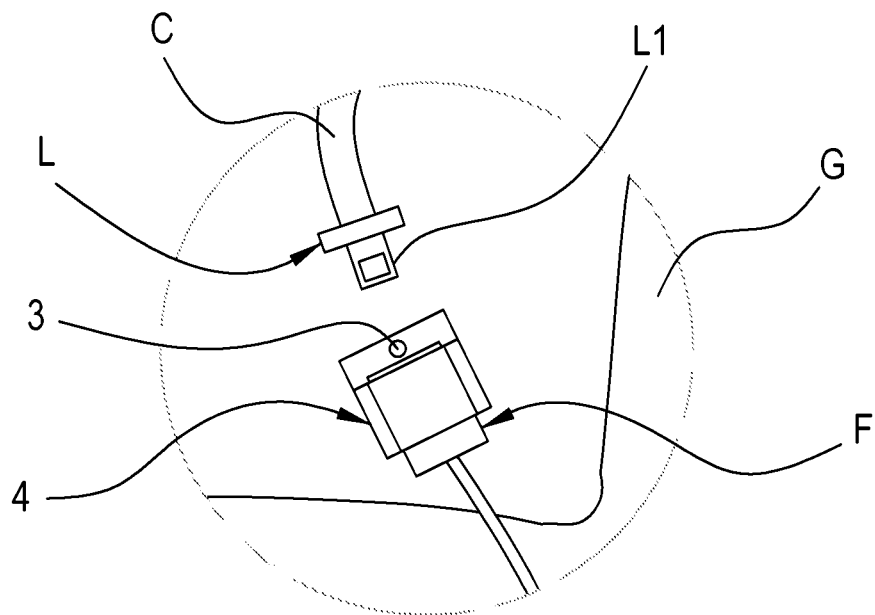
FIG. 2 is a detailed view of the schematization of FIG. 1.
Figure 6:
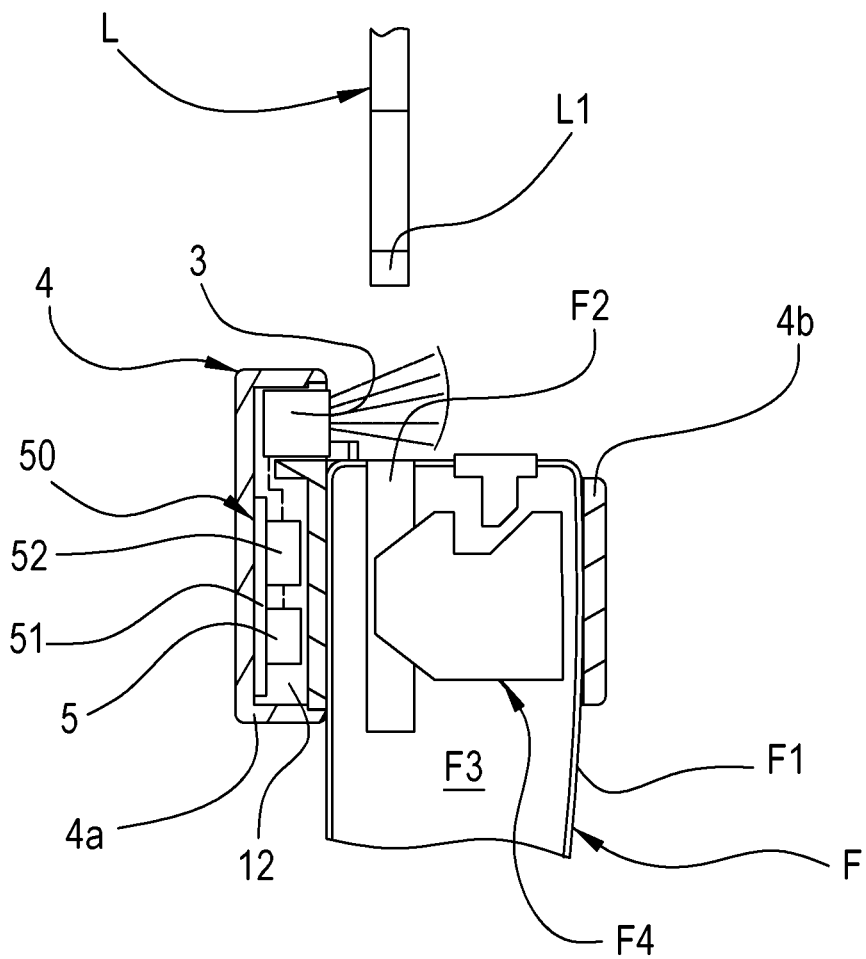
FIGS. 6 and 7 show schematically different operating conditions of the safety belt, with which a coupling element of the anti-abandonment system is associated in accordance with the present invention.
Figure 7:
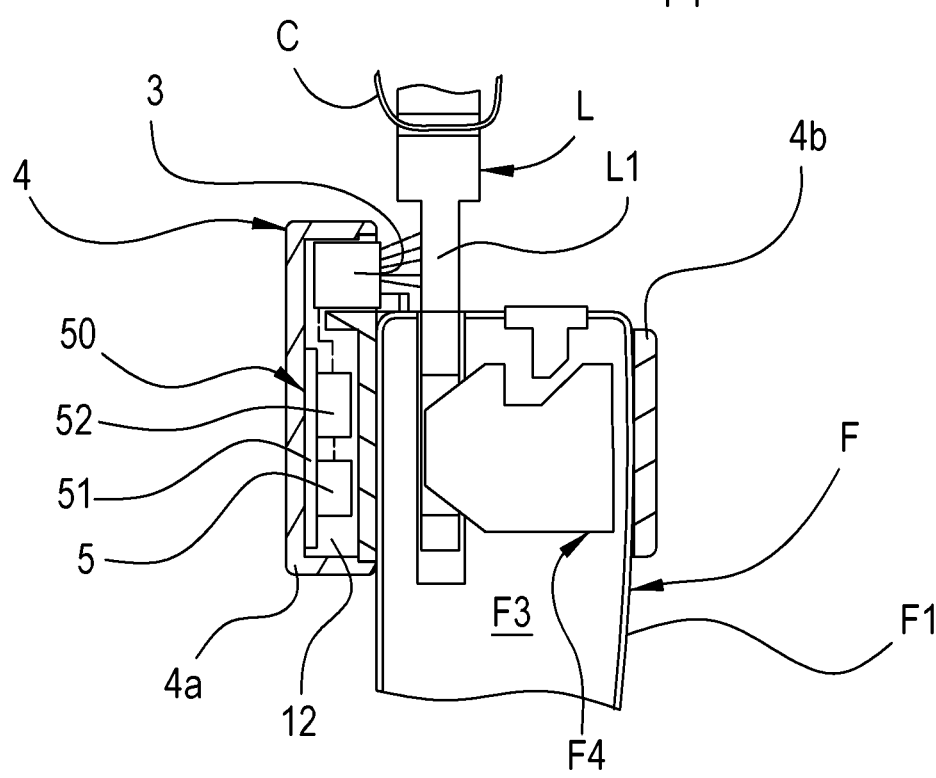
Figure 8:
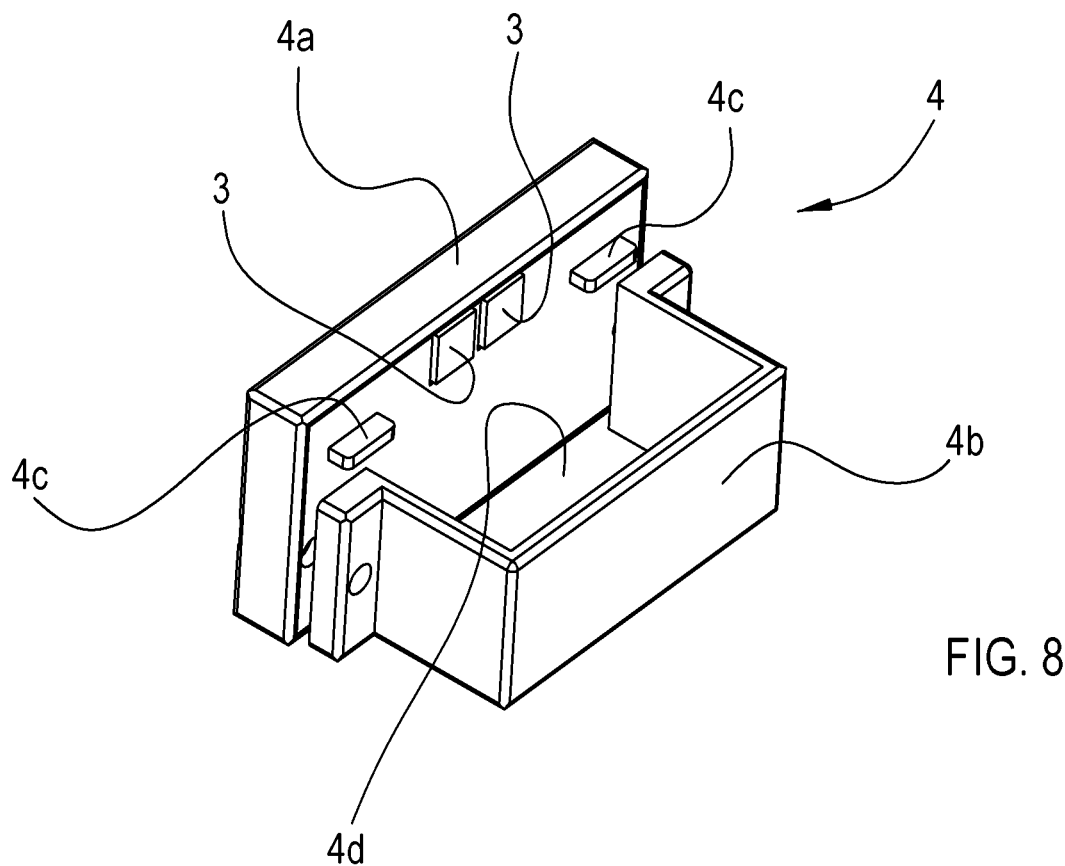
FIGS. 8 and 9 show a coupling element of the anti-abandonment system in accordance with the present invention.
Figure 9:
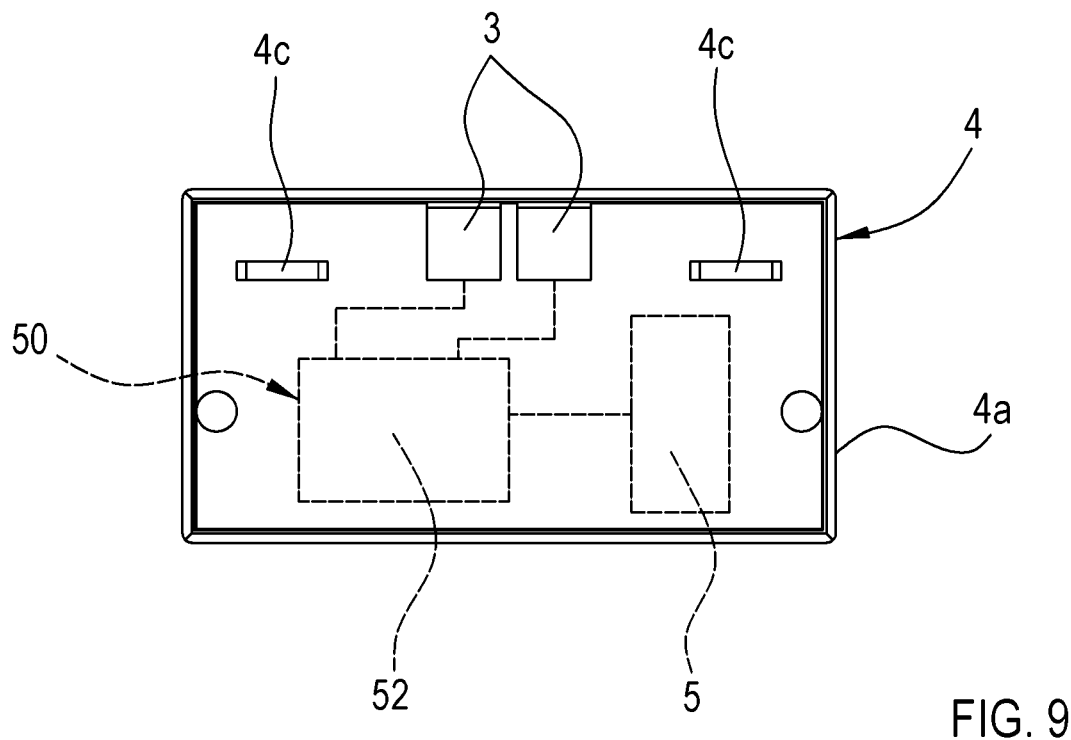

Illustrated in the enclosed figures, in a non-limiting manner, is a configuration in which the second sensor 3 is carried together with the fastening buckle (see for example FIGS. 1 and 2): on the fastening tab L, there is no component present that is ascribable to the second sensor 3. In such configuration, the second sensor 3 is configured to directly detect the safety belt S of the driver and in particular directly the fastening tab L: on the fastening tab L, there are no additional components of the second sensor 3 which can communicate with components installed on the buckle. Indeed, the second sensor directly senses the presence of the fastening tab: the control unit processes the signal emitted by the second sensor and interprets the direct detection of the fastening tab as fastened condition of the safety belt. In FIGS. 6 and 7, the operation of the second sensor 3 is schematically illustrated. In FIG. 6, the second sensor sends a signal representative of the absence of the tab L while in FIG. 7 the second sensor 3 sends, to the control unit 50, a signal representative of the direct identification (presence) of the fastening tab L, in particular engaged with the buckle F.

As is visible for example in FIGS. 3 to 7, the anti-abandonment system 1 comprises a coupling element 4 configured to be stably engaged with the fastening buckle F of the safety belt S of the driver; the second sensor 3 is stably carried by the coupling element 4. In detail, the coupling element 4 is engaged with the block F1 of the fastening buckle F outside the compartment for example by means of a first and a second jaw 4*a*, 4*b* defining a seat 4*d* configured to receive the block F1 of the fastening buckle F. The first jaw 4*a* defines for example a support 40*a*, while the second jaw defines a holding element 40*b* engaged with the support 40*a* (optionally by means of screw or similar mechanical constraint. The second jaw 4*b* (or correspondingly the holding element 40*b*) is configurable in an engagement configuration in which it stably constrains the block F1 (optionally preventing the relative movement between the fastening buckle F and the coupling element 4); in the engagement configuration, the holding element 40*b* (i.e. the second jaw 4*b*) has at least one blocking portion active on the block F1 on the opposite side of the support 40*a* (i.e. opposite the first jaw 4*a*) to at least partially secure the block F1 and press it towards the support 40*a*, holding it in position. In still more detail, the first and the second jaw 4*a*, 4*b* are relatively movable with respect to each other at least between:

a spaced position in which the first and the second jaw 4*a*, 4*b* are configured to allow the positioning of the block F1 in the seat 4*d*;

a close position in which the first and the second jaw 4*a*, 4*b* are configured to stably constrain the block F1, optionally preventing the relative movement between the fastening buckle F and the coupling element 4.

Figure 20:
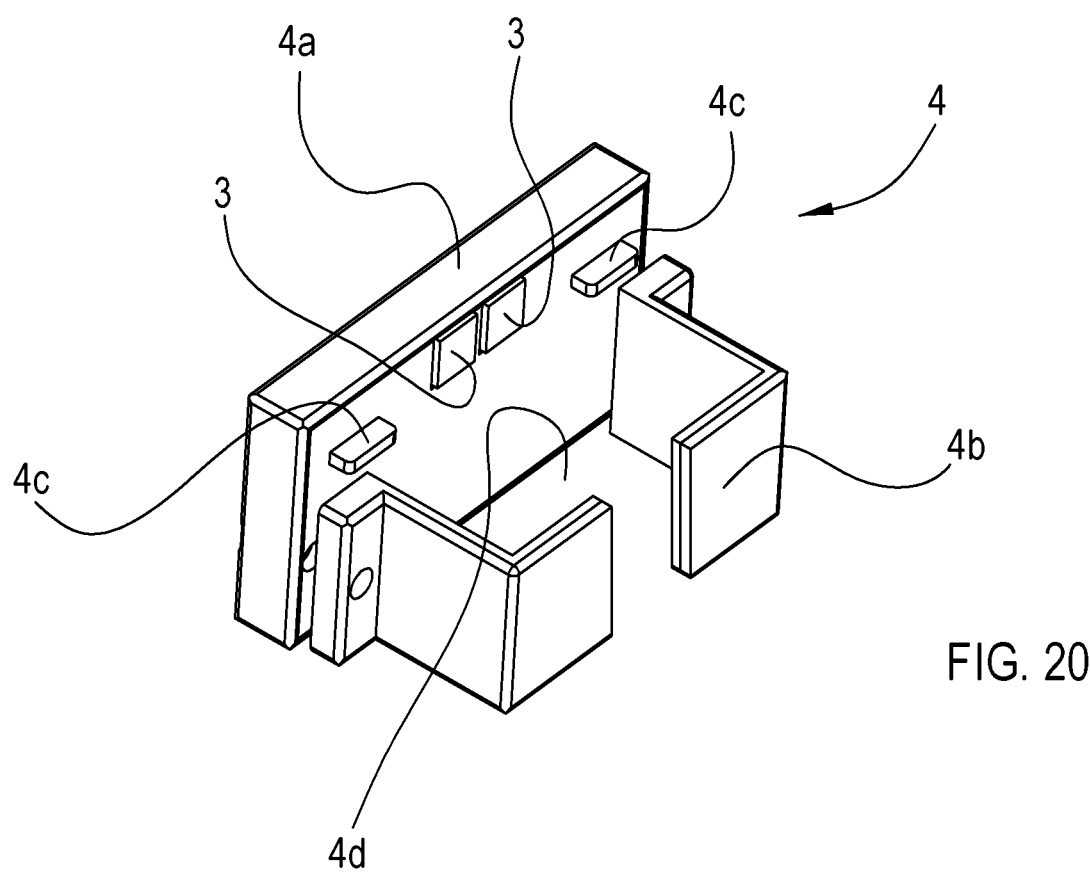

Illustrated in a non-limiting manner in the enclosed figures is a coupling element comprising the first and the second jaw; nevertheless it may be possible to provide for a coupling element 4 in which the second jaw 4*b* is formed by two half-parts, a first half-part which is engaged with the first jaw 4*a* and which comprises a lateral left arm and the blocking portion 40*b* which operates on the opposite face of the block F1, and a second half-part which is engaged with the first jaw 4*a* and which comprises a lateral right arm and the blocking portion 40*b* which operates on the opposite face of the block F1 on the opposite edge. In other words, in this second embodiment, the second jaw 4*b* is in two separate pieces (e.g. mirrored) that are not directly connected to each other on the side opposite the first jaw 4*a*. See FIG. 20 on this matter. Nevertheless it may be possible to provide for a coupling element 4 made of a single body, for example of deformable material and/or elastic material which allows the element 4 to be fit (adapted) with the fastening buckle F.

Figure 16:
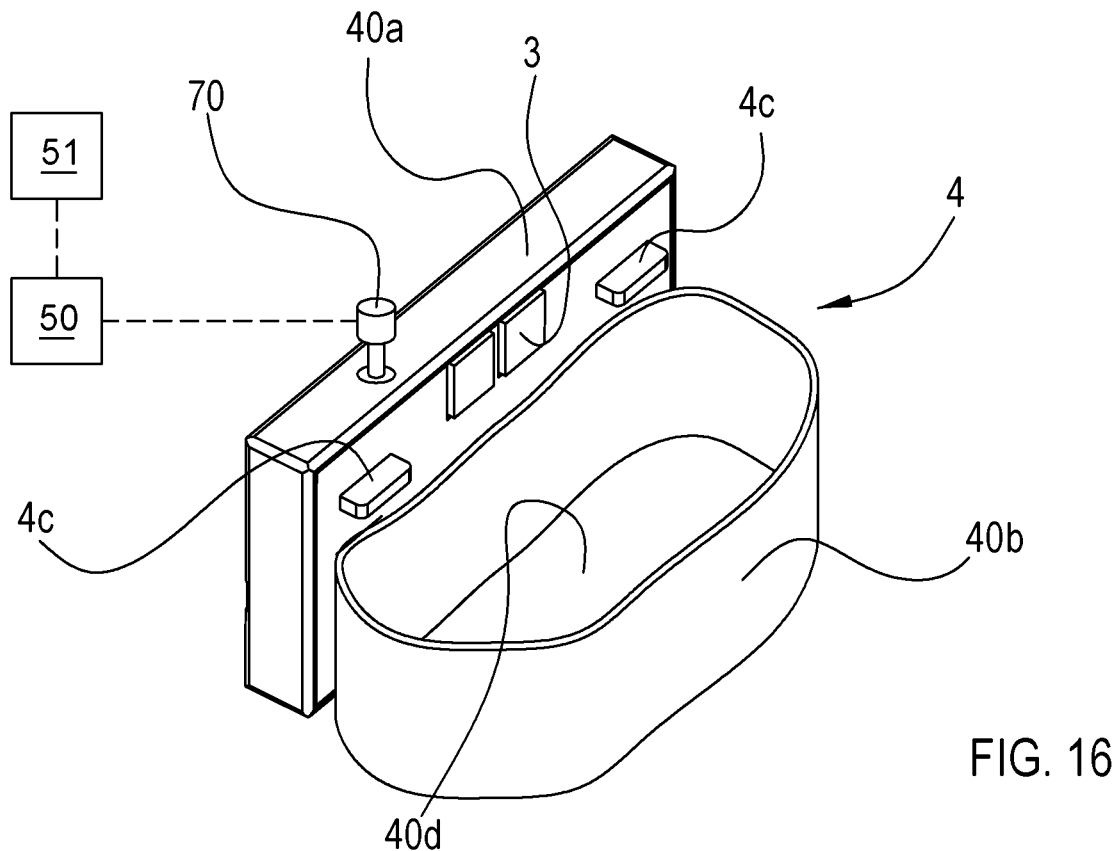
FIGS. 16-18 and 20 respectively show further embodiments of the coupling element of FIG. 8.
Figure 17:
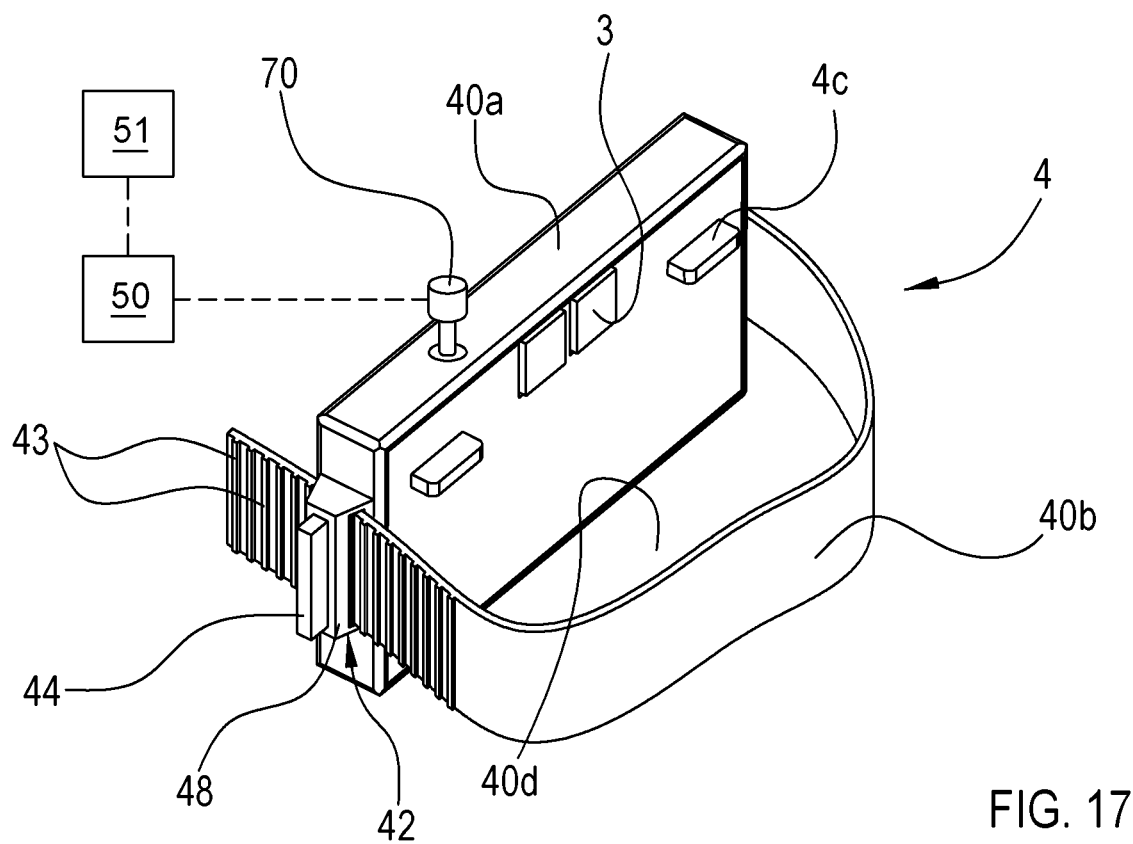
Figure 18:
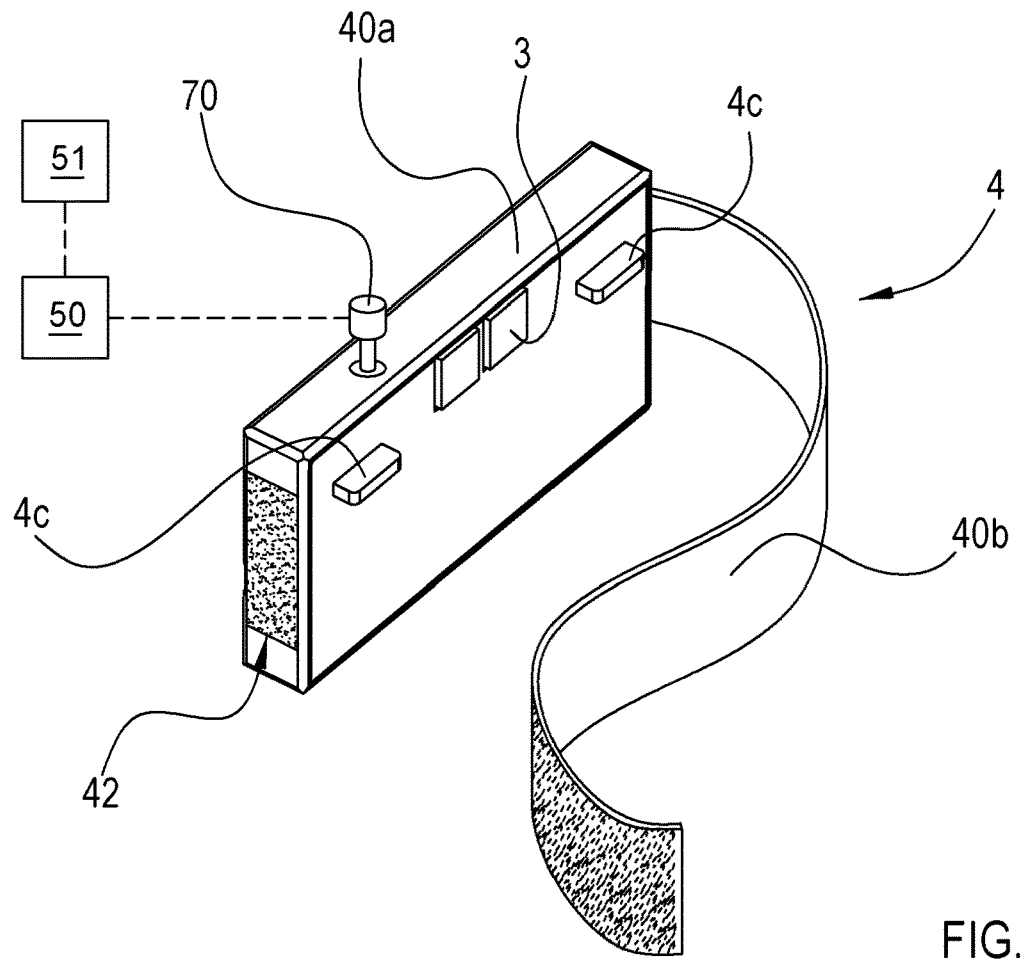
Figure 19:
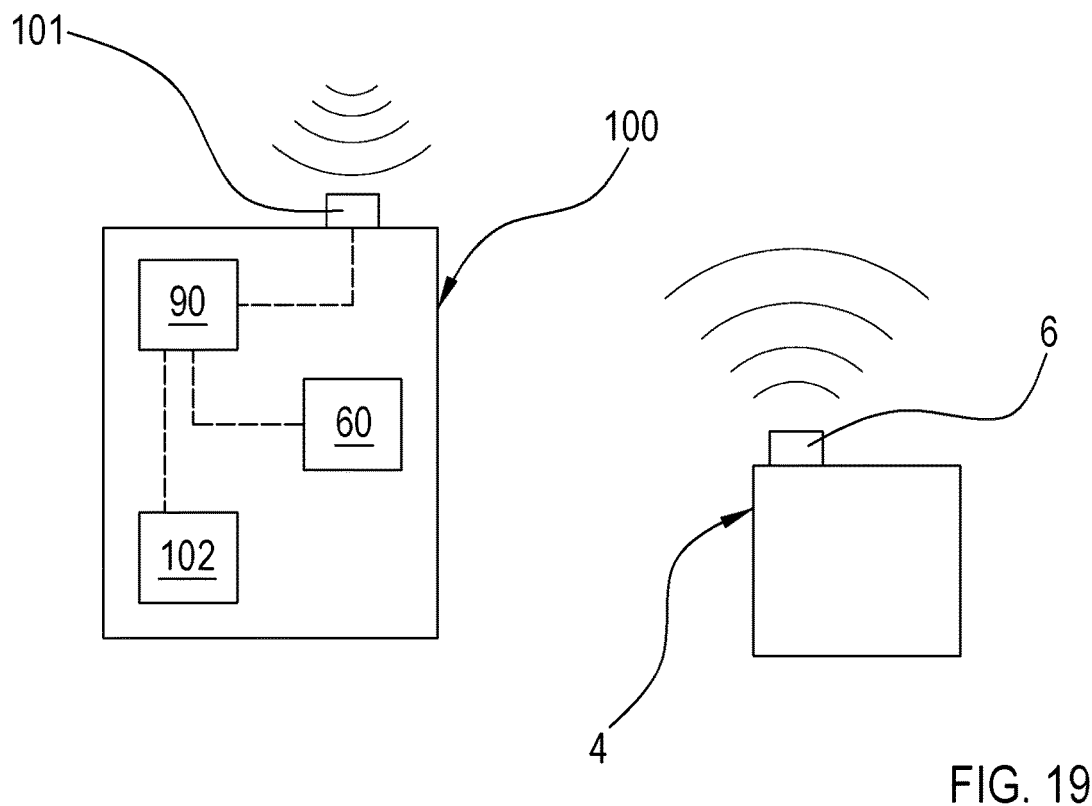
FIG. 19 is a schematic view of a mobile device of the anti-abandonment system in accordance with the present invention.

In one embodiment of the coupling element 4, for example shown in FIGS. 16-18, the latter can have the abovementioned support 40*a* and at least one abovementioned holding element 40*b* engaged with the support 40*a* and configured to define a seat 40*d*. In particular, the holding element 40*b*, in cooperation with the support 40*a*, defines an external perimeter profile delimiting the seat 40*d*, the latter configured to receive in insertion the block F1 of the fastening buckle. It is useful to observe that in the embodiment of the coupling element 4 illustrated in FIG. 16, the holding element 40*b* has the capacity to be deformed, optionally elastically, so as to allow the removable engagement between the blocking device and the block F1. The holding element 40b thus defines a variable passage section of the seat 40d, allowing the engagement between the same holding element 40b and a block F1 having a suitable transverse size. Such characteristic in fact renders the anti-abandonment system installable on cars having blocks F1 of different dimensions, allowing a user to install the anti-abandonment system on different cars of his/her ownership.

In accordance with a further embodiment of the coupling element 4 shown in FIGS. 17 and 18, the latter has a holding element 40b movable relative to the support 40a at least between a first operating position in which the holding element 40b is disengaged from the support 4a, and a second operating position in which the holding element 40b is engaged with the support 4a. The holding element 40b has an elongated body extending along a predetermined longitudinal profile between a first end portion, in which it is engaged with the support 40a, and a second end portion, in which it is engaged with a locking system 42. In the embodiment of the coupling element 4 shown in FIG. 17, the elongated body has a predetermined number of locking teeth 43 that are separate and spaced from each other along the longitudinal extension of the elongated body and emerging transverse to the latter, defining a respective protuberance: each locking tooth 43 is then configured to engage the locking system 42 at a respective protuberance. It is also useful to observe that the elongated body has at least one seat, defined in interposition between two protuberances that are adjacent to each other, configured to house a hook 44 of the locking system 42, in a manner such to define, in the second operating position of the holding element 40b, the stable engagement between the elongated body and the locking system 42. In the embodiment of the coupling element 4 shown in FIG. 18, the latter can for example have, at the second end portion, an engagement surface, for example made of Velcro, configured to allow the constraint between the same elongated body and the locking system 42 in the second operating position of the holding element 40b. It is also useful to observe that the engagement between the elongated body and the locking system 42 allows the holding element 40b to engage the block F1. As previously mentioned, the coupling element 4 can comprise at least one locking system 42, defined on the support 40a, and configured to constrain the holding element 40b in the second operating position. The holding element 40b can be movable relative to the locking system 42, during the passage between the first and the second operating position.

In the embodiment of the coupling element 4 shown in FIG. 17, the locking system can comprise at least one base body 48, on which a through opening is defined that is configured to receive the coupling element 4 in crossing. The elongated body, in the second operating position of the holding element 40b, is thus arranged in engagement inside the through opening of the base body 48.

The locking system 42 can further comprise the hook 44 movable relative to the base body 48 and configured to engage at least one locking tooth 43, constraining the elongated body with the support 40a. The hook 44 can also be movable via rotation relative to the base body 48 at least between a spaced position in which allows the insertion of the elongated body inside the through opening of the base body 48, and a close position in which engages a locking tooth 43. It is also useful to observe that a user, by arranging the hook 44 in the spaced position, can arrange the elongated body inside the through opening of the base body to define the seat 40d.

The hook 44, in the close position, is instead housed inside the seat of the elongated body, constraining the latter to the support 40a, as well as constraining the holding element 40b with the block F1 of the fastening buckle F. In the embodiment of the coupling element 4 shown in FIG. 18, the locking system 2 can instead have an engagement surface, e.g. made of Velcro, configured to constrain the respective engagement surface of the elongated body. The coupling element 4 can for example be at least partially made of at least one of the following materials: silicone, rubber, plastic, aluminum, steel, iron.

It is useful to observe that the second sensor 3 is configured to be placed in proximity to the slot F2 of the block F1 in a manner such that the same second sensor 3 can directly detect the presence of the fastening tab L, optionally directly detect the presence of the inserting portion L1; the signal of the second sensor 3 is thus representative of a position of the inserting portion L1 of the fastening tab L in the compartment of the block F1 and hence of an engagement condition of the insertion portion L1 with the locking mechanism F4 (see for example FIG. 7) of the block F1 to define said fastened condition of the safety belt. Illustrated in the enclosed figures, in a non-limiting manner, is a second sensor placed outside the compartment of the block in a manner such that the same sensor 3 can detect, from outside the block F1, the presence of the fastening tab L. Of course, it may be possible to arrange the second sensor 3 inside the compartment F3 of the block F1 in a manner such that the second sensor 3 can detect the presence of the tab L when placed inside the block F1 in coupling to the blocking device F4. Of course, the positioning outside the block F1 simplifies the installation of the anti-abandonment system 1 and renders the user autonomous in the arrangement of the same.

Figure 3:
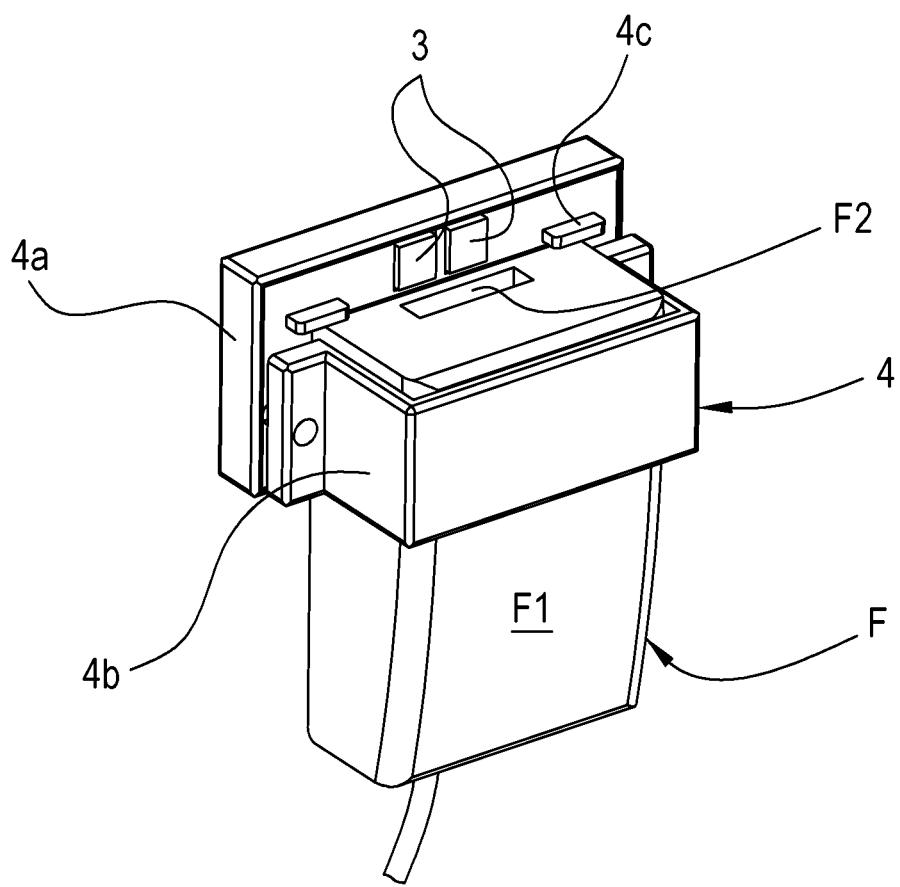
FIGS. 3 and 4 are respectively a perspective view and a front view of a coupling element associated with a fastening buckle of a safety belt of the driver of a car.
Figure 4:
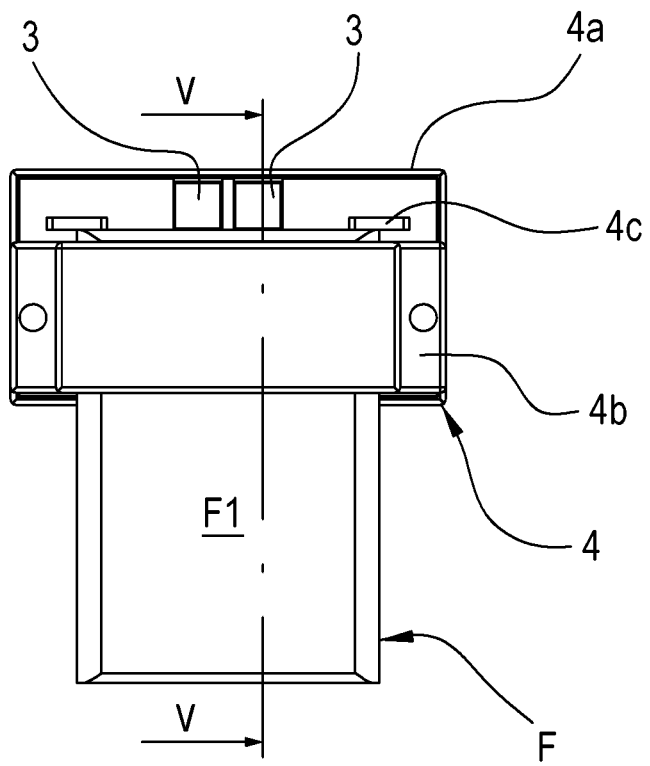
Figure 5:
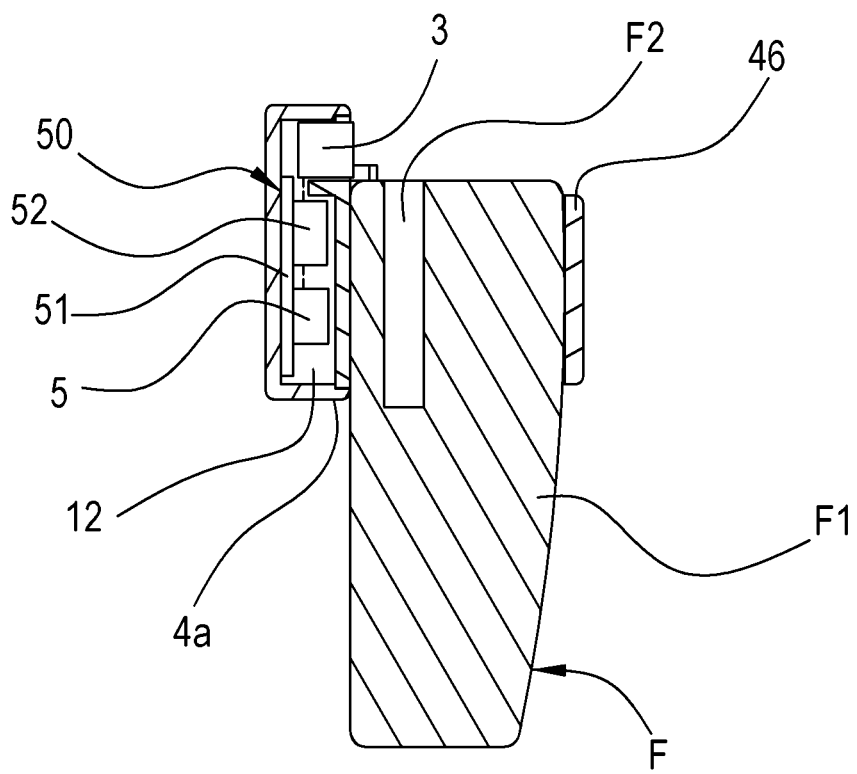
FIG. 5 is a sectional view, according to trace V-V, of the coupling element associated with a fastening buckle of a safety belt of FIG. 4.

As is visible for example in FIG. 3, the coupling element 4 can comprise one or more positioning elements 4c configured to allow the quick and correct mounting of the coupling element 4 on the fastening buckle F: in this manner, it is possible to arrange the sensor 3, carried by the coupling element, in the correct position for detecting the fastening tab L.

The anti-abandonment system 1 can comprise one or more sensors 3. In the enclosed figures, an anti-abandonment system comprising two second sensors 3 is also illustrated; it may be possible to provide for only one second sensor 3 (e.g. only one emitter/receiver sensor) or a number of second sensors 3 higher than two. The second sensor 3 comprises at least one selected in the group between: an optical sensor, an infrared optical sensor, a capacitive sensor, a magnetic sensor, an ultrasound transducer, a micro-switch, a micro-button. As for the first sensor 2, also the second sensor 3 is connected, by means of a wired circuit, to the control unit 50; nevertheless, it may be possible to use a wireless transmission system (e.g. Bluetooth or Wi-Fi) for transmitting the signal emitted by the second sensor 3 to the control unit 50. The second sensor 3 can be directly connected to the control unit 50. It is useful to observe that the deactivation condition of the control unit 50 can also be commanded by a deactivation button 70, connected to the control unit 50 and configured to emit a predetermined number of command signals in order to command a temporary deactivation condition to the latter. For example, the temporary deactivation of the control unit 50 can be useful in the event that it is necessary to make a temporary stop, for example for refueling the car, for which it is not required to execute the control procedure for warning of a potentially hazardous situation.

In particular, each command signal emitted by the deactivation button 70 is representative of a minimum duration value of the temporary deactivation condition. Indeed a user, by actuating the deactivation button 70, can set the duration of the temporary deactivation condition, which can be comprised between 30 s and 600 s. The minimum duration value can take on a predetermined constant value, for example equal to 30 s, equal to the minimum duration of the temporary deactivation condition. It is useful to observe that the duration of the temporary deactivation condition can be increased following each successive activation of the deactivation button 70, by an amount equal to the minimum duration value. In other words, the duration of the deactivation condition, following a first actuation of the deactivation button 70, takes on the minimum duration value, and it can be increased by an amount equal to the minimum duration value as a function of the number of actuations of the deactivation button 70. The latter can thus be configured to emit a respective command signal for each actuation of the button performed by the user. The control unit 50, following the reception of said command signals, is thus configured in order to define the temporary deactivation condition, determining the duration thereof. It is in fact useful to note that the control unit 50 can comprise at least one memory buffer configured to keep track of the command signals received from the same control unit 50. In detail, the memory buffer is configured to store at least one minimum duration value of the temporary deactivation condition. Following the detection of a plurality of command signals by the control unit 50, the buffer is configured to store each minimum duration value and perform the sum of the latter, in a manner such to define a threshold value representative of the total duration of the temporary deactivation condition set by the user. The control unit 50 can be configured to send the threshold signal to a timer 71, the latter adapted to emit a timeout signal, as a function of the threshold signal, and representative of the end of the temporary deactivation condition. The control unit 50 is therefore configured to detect the timeout signal emitted by the timer 71 and subsequently the reception of the latter, restarting the execution of the control procedure. As mentioned above, the anti-abandonment system can further have at least one timer 71 connected to the control unit 50, configured to detect the threshold signal and perform a count procedure comprising the steps of:

increasing a count value,
comparing said count value with the threshold signal,
emitting the timeout signal following the verification of the equivalence between the count value and the threshold signal,
resetting the count value.

In other words, the timer 71, by increasing the count value by a predetermined amount, e.g. equal to 1 s, is configured to keep track of the passage of time. It is useful to observe that the count procedure executed by the timer 71 has a time duration equal to the duration of the temporary deactivation condition. The timer 71, following the emission of the timeout signal, thus defines the end of the temporary deactivation condition, allowing the control unit to restart the execution of the control procedure and detect possible alarm conditions, detecting the signals emitted by the first and by the second sensors 2, 3. In detail, the control unit 50 comprises an electronic board 51 and at least one microprocessor 52 connected to the electronic board 51. The second sensor 3, optionally also the first sensor 2, is connected to the electronic board 51 of the control unit 50 which is configured to receive the signal from the second sensor and to transmit it to the microprocessor 52 which is configured to perform the control procedure. The electronic board 51 is connected to a power supply of the vehicle, for example the battery of the car or the control unit. In particular, following the connection of the electronic board 51 to the control unit, the control unit 50 can be configured to detect a starting signal emitted by the vehicle, as well as determine a driving condition of the vehicle by means of the reception of the starting signal. The electronic board 51 is also electrically connected to a battery 5 and/or to a supercapacitor configured to electrically power supply the electronic board 51 and consequently the microprocessor 52 and the second sensor 3. In the event that the first sensor 2 is connected to the electronic board 51, the latter is configured to electrically power supply also said first sensor 2.

In detail, and as illustrated in the enclosed figures, the control unit 50 is carried directly by the coupling element 4; in particular, the coupling element 4 comprises a respective casing defining a compartment 12, inside which the electronic board 51, the microprocessor 52 and the battery or the supercapacitor of the control unit 50 are housed. The second sensor 3 can also be housed at least partially in the compartment 12 of the coupling element 4. Illustrated in the enclosed figures, in a non-limiting manner, is a control unit 50 carried by the first portion 4a of the coupling element 4. It may also be possible to arrange the control unit in association with the second portion 4b or separated from said coupling element 4. As schematized in FIG. 1, the anti-abandonment system 1 also comprises at least one emitter 6 connected to the control unit 50, for example by means of a wired circuit, and configured to emit at least one from among an acoustic signal, a haptic signal and a visual signal; the control unit 50, following the definition of the alarm condition, is configured to command the emitter 6 to emit at least one among said acoustic signal, haptic signal and visual signal to warn of a potentially hazardous situation to the driver relative to the presence of an infant/child inside a vehicle. Indeed, the emitter 6 represents the element of the anti-abandonment system adapted to signal the alarm condition. It is also useful to observe that the emitter can be configured to emit at least one among an acoustic signal, haptic signal and visual signal, specific for any one of the conditions detectable by the control unit 50. In particular, the emitter 6 is configured to emit a plurality of acoustic signals that are at least partially different from each other, each of which representative of an operating condition of the anti-abandonment system detectable by the control unit 50. Indeed, the control unit 50 is configured to command the emitter 6 to reproduce a specific acoustic signal for each from among the active condition, the deactivated condition, the alarm condition, the inactivity condition and the driving condition. The emitter 6 can also be associated with the coupling element 4 or it can be defined by an element separate from the coupling element 4 and from the seating device 7 positionable inside the vehicle in a zone adapted to allow the effective signaling to the user regarding the alarm condition. For example, the emitter 6 can be positioned at the dashboard of a motor vehicle or at the buckle F. Alternatively, the control unit 50 can be connected, by means of wired circuit, to the horn of the car and configured to command the activation of the horn and/or of the emergency lights following the definition of the alarm condition.

The control unit 50 can be configured to command the activation of the emitter 6 and/or of the horn of the car immediately after having defined the alarm condition; the control unit 50 can also be configured to send the command signal to the emitter 6 and/or to the horn and/or to the emergency lights of the car after a predetermined time period, possibly in two time settable by the user by means of the same control unit 4, by the determination of the alarm condition. In this manner, the control unit 50 could give time to the driver to unfasten the safety belt S and remove the child and/or infant from the vehicle before the emitter and/or the horn and/or the emergency lights of the car are activated. For example, the control unit p50 can be configured to determine the alarm condition and command the emitter, by means of sending a first command signal, to emit a first optical, acoustic and/or haptic warning signal and after a certain time period, if the presence of the child on the restraining device R is still detected, sending a command signal to the emitter, for the emission of a second alarm signal (still of optical, acoustic and/or haptic type) in order to signal the abandonment of the child and/or infant in the vehicle. Indeed, the control unit 50 generates a first optical, acoustic and/or haptic alarm as soon as the safety belt of the driver is released, in order to give the time necessary for the driver to take the child, and thereafter—if the alarm condition persists—in a second step activating the actual alarm (for example given by the activation of horn and emergency lights) which signals the abandonment of the child and/or infant in the vehicle. The control unit 50 can also be configured to deactivate the alarm condition as soon as there is no detected presence of the child and/or infant on the restraining device R. In this manner, the control unit 50—due to the delay in the activation of the emitter 6 and/or of the horn of the car and together with the possibility to deactivate the alarm condition in the event that the child and/or infant is picked up from the vehicle—allows signaling only actually hazardous situations relative to the abandonment of a child and/or an infant inside the vehicle and preventing the activation of the emitter 6 and/or the horn and the emergency lights of the car in the case of brief stops or in the case of unfastening of the safety belt for the removal of the child from the vehicle.

The anti-abandonment system 1 can also comprise:
- at least one acoustic indicator (e.g. the emitter 6 and/or the horn of the car) connected to the control unit 50 and configured to emit at least one acoustic signal,
- at least one mobile device configured to:
  - detect said acoustic signal,
  - following the detection of said acoustic signal, determine a hazardous condition,
  - following the determination of the hazardous condition, emit a warning signal.

Indeed, as mentioned above, the control unit 50 is configured to command the acoustic indicator, in particular the emitter 6, to emit a specific acoustic signal as a function of the detected operating condition. The acoustic signal can thus vary following the detection of the active condition, the deactivated condition, the alarm condition, the inactivity condition and the driving condition. The mobile device can also comprise at least one microphone 101, directly connected to a control unit 90 of the mobile device, and configured to detect the acoustic signal emitted by the emitter 6. In particular, the microphone 101 is configured to detect an acoustic signal and send it to the control unit 90 of the mobile device in order to be analyzed. The mobile device can further comprise an internal memory 102 configured to store a predetermined number of reference signals, each of which corresponding to an acoustic signal reproducible by the emitter 6. In particular, the internal memory 102, as detailed below, is also configured to store a predetermined number of points of interest, each of which representative of a predetermined geographic position of the mobile device.

The mobile device can further comprise a control unit 90 configured to perform an acoustic signal recognition procedure comprising at least one step of sampling the acoustic signal detected by the microphone. In particular, the step of sampling the acoustic signal allows converting the detected acoustic signal into a digital signal, which can be easily manipulated and analyzed. Indeed, the digitized signal can be analyzed regarding frequency such to be able to easily detect the acoustic tones of the signal and hence recognize if such signal corresponds to a known signal, for example corresponding to the reference signal. The recognition procedure can in fact comprise a step of comparing the sampled signal with a reference signal, which can in turn provide for the steps of:
- determining a frequency signal of the sampled signal,
- determining a respective frequency signal of the reference signal,
- determining a temporary signal equal to the difference between the frequency signal of the sampled signal and the frequency signal of the reference signal,
- comparing the temporary signal with a predetermined interval of frequencies.

By converting the sampled signal and the reference signal into respective frequency signals, it is possible for the control unit 90 of the mobile device to perform the mathematical operations on the same, facilitating the recognition of the signals. Indeed, the recognition of the signal detected by the microphone can be reached by only analyzing the temporary signal, which comprises the information contained in the sampled signal and the reference signal. The control unit 90 of the mobile device is therefore configured to compare the temporary signal with a predetermined interval of frequencies. It is in fact useful to observe that said interval of frequencies is to be considered as a maximum interval within which the sampled signal, in order to be considered equal to the reference signal, must fall. In other words, the sampled signal, in order to be considered equal to the reference signal, can at most vary by a frequency comprised in the predetermined interval of frequencies. The recognition of the sampled signal terminates when the frequencies of the temporary signal are comprised within the predetermined interval of frequencies.

The recognition procedure can then comprise a step of emitting a warning signal, detectable by an auxiliary emitter 60 detailed hereinbelow, representative of the occurred recognition of the acoustic signal, in a manner such to give proof to an external user of occurred recognition of the signal. It is also useful to observe that, in the event that the sampled signal is not comprised inside the predetermined interval of frequencies, the control unit 90 of the mobile device is configured to newly perform the step of comparing the sampled signal, considering a new reference signal, as long as an equivalence is detected between the sampled signal and the reference signal.

The mobile device can further comprise at least one GPS module connected to the control unit 90 of the mobile device and configured to emit at least one location signal representative of the position of the mobile device on the planet. In particular, the GPS module is configured to emit a location signal for each predetermined time interval.

The control unit 90 of the mobile device can also be configured to perform a procedure of detection of the mobile device comprising the steps of:
- detecting at least one location signal,
- comparing said location signal with each point of interest stored in the internal memory, emitting a signal of occurred location representative of the correspondence between a location signal emitted by the GPS module with a point of interest stored in the internal memory.

The control unit 90 of the mobile device, following the detection of the location signals, allows establishing the path executed by the mobile device and verifying if the latter has moved through at least one point of interest, the latter for example being representative of the position of the daycare, of the grandparents' house or babysitter's house. The mobile device 100 can further comprise at least one auxiliary emitter 60 directly connected to the control unit 90 of the mobile device and configured to:

receive the warning signal and/or of occurred location emitted by the auxiliary control unit 90 of the mobile device, reproduce at least one among an acoustic signal, haptic signal and visual signal.

In particular, following the reception of the signal of occurred location, the control unit 90 of the mobile device recognizes the transit of the mobile device by means of a point of interest and, consequently, recognizes that a user has correctly brought the child to daycare, to the grandparents' house or to the babysitter's house. Following the lack of reception of the signal of occurred location, the auxiliary emitter 60 is configured to reproduce at least one among an acoustic signal, haptic signal and visual signal, such to warn the user regarding the verification of an irregularity. In particular, the auxiliary emitter 60 can comprise at least one display which, following the reception of the warning signal, is configured to visually show a user the occurred recognition of the sampled signal and/or the lack of reception of the signal of occurred location, consequently giving proof of a potentially hazardous situation inside the vehicle.

It is also useful to note that the anti-abandonment device can comprise a plurality of movable devices interconnected with each other to define a network of movable devices (100), each of which configured to perform a procedure of detection of the mobile device. In detail, each mobile device is configured to send the signal of occurred location to each mobile device belonging to the network of movable devices. Following the lack of reception of a signal of occurred location emitted by a mobile device of the network, the auxiliary emitter 60 of each mobile device is configured to reproduce at least one among an acoustic signal, haptic signal and visual signal, in a manner such to warn the user that an irregularity has been verified. The interconnection between the movable devices of the network indeed allows notifying each user of the mobile device regarding the verification of an irregularity, allowing him/her to warn other users of the network to make provisions and to make sure to not forget the child/infant in the car. The mobile device can for example comprise a smartphone configured to execute, separate from the emitter 6 and/or from the horn of the car, a hazardous warning signal relative to the presence of an infant/child inside a vehicle. The anti-abandonment system 1 can also comprise at least one temperature sensor, e.g. a thermistor, configured to send a signal representative of the temperature present inside the vehicle. The control unit 50 is connected to the temperature sensor and it is configured to determine, as a function of the signal emitted by said temperature sensor, the temperature present in the vehicle and determine an alarm condition in the event that:

the control unit determines the presence of the child and/or infant on the restraining device R;

the control unit determines a temperature inside the vehicle that is above a predetermined threshold.

In this configuration, the control unit 50 is configured in order to define the alarm condition independent of the determination of the fastened or unfastened condition of the safety belt S of the driver. The control unit 50 can also be configured to detect the disconnection of the first sensor 2 from the control unit 50 itself and provide a signal to the user. For example, the control unit 50 can be configured to detect the absence of signal or, in the event that the first sensor 2 is connected to the control unit 50 by means of one or more electrical resistors, an infinite electrical resistance. Such conditions are representative of the lack of connection of the first sensor by the control unit 50: in such condition, the control unit 50 is configured to signal, for example by means of commanding the emitter and/or the horn of the car, an alarm condition and/or irregular condition of the anti-abandonment system.

Process for Signaling a Hazardous Situation

Also forming the object of the present invention is a process for signaling a potentially hazardous situation relative to the presence of an infant/child inside a vehicle, for example by using the anti-abandonment system 1 in accordance with the above-reported description and/or in accordance with any one of the enclosed claims. The process comprises a step of arranging the first sensor 2 on a restraining device R housed in the vehicle. In particular, such step provides for abutting the seating device 7 against the predefined area of the restraining device R dedicated to receiving the child and/or infant. The restraining device R can for example comprise at least one between: a child seat for children, a pod for infants. The process also provides for the engagement of the second sensor 3 with only one between the fastening buckle F and the fastening tab L of the safety belt S of the driver. In the enclosed figures, a condition was illustrated for engaging the second sensor 3 only on the fastening buckle F: on the fastening tab L, no component of the second sensor 3 is applied. The arrangement of the second sensor 3 can be performed by means of coupling of the coupling device 4 with the fastening buckle F of the safety belt S of the vehicle. Once the first and second sensors are arranged, the process provides for executing the control procedure, e.g. executed by the control unit 50, which comprises the following steps:

determining, as a function of the signal emitted by the first sensor 2, the presence of a child and/or an infant on the restraining device R, determining, as a function of the signal emitted by the second sensor 3, the fastened condition or the unfastened condition of the safety belt, defining an alarm condition in the event that the presence of a child and/or an infant on the restraining device is determined and at the same time the unfastened condition of the safety belt of the driver is determined.

In particular, during the execution of the control procedure, the alarm condition is defined, during the determination of the presence of a child and/or an infant on the restraining device R, following the determination of the passage from the fastened condition to the unfastened condition of the safety belt.

In detail, the step of determining the presence of a child and/or an infant on the restraining device R comprises the following sub-steps of:

positioning a child and/or an infant on the first sensor 2 housed on the restraining device R, sending, by the first sensor 2, a signal representative of the presence of a child and/or an infant on the restraining device R, receiving, by the control unit 50, the signal of the first sensor 2, determining, as a function of the signal, the presence of a child and/or an infant on the restraining device R.

The process is configured to perform the control procedure only following the determination of the presence of a child and/or an infant on the restraining device R and the determination of the fastened condition of the safety belt. Following the definition of the alarm condition, the process comprises signaling said condition for example by means of activation of the emitter 6 and/or of the car horn in a manner such that the driver can be immediately warned of the potential hazardous situation relative to having left/abandoned a child and/or an infant inside the vehicle. The signaling can be carried out immediately after the determination of the alarm condition or after a predetermined time period, for example adjustable by the driver. The process can also comprise a step of deactivating the control procedure, commanded for example by means of a temporary deactivation button by the same driver or automatically commanded by the control unit 50 of the anti-abandonment system 1 following the picking up of the child and/or infant from the restraining device R.

Process for Recognizing an Acoustic Signal

Also forming the object of the present invention is a process for recognizing an acoustic signal, for example by using the anti-abandonment system 1 in accordance with the above-reported description and/or in accordance with any one of the enclosed claims. The process can comprise a step of storing a plurality of acoustic signals representative of a specific operating condition detectable by a control unit 50. In fact, such step allows storing an entire plurality of acoustic signals that can be emitted by an emitter 6 of an anti-abandonment system, defining a plurality of reference signals. The process can also comprise a step of reproducing an acoustic signal by means of the emitter 6. In particular, such step provides for reproducing an acoustic signal representative of one from among the active condition, the deactivated condition, the alarm condition, the inactivity condition and the driving condition.

The process can then comprise the steps of:

sampling an acoustic signal reproduced by the emitter 6, comparing the sampled signal with a reference signal.

If the sampled signal corresponds to the reference signal, the process can further provide for a step of emitting a warning signal to an auxiliary emitter 60 of the mobile device, representative of the occurred recognition of the acoustic sampled signal. The process can then comprise a step of reproducing a visual signal and/or acoustic signal executed by the auxiliary emitter 60. Such step thus allows giving proof to a user of occurred recognition of the acoustic signal and consequently of an occurred detection of a potentially hazardous situation inside the vehicle.

Vice versa, if the sampled signal does not correspond to the reference signal, the process can provide for the execution of a further step of comparison between the sampled signal and a further reference signal among those stored during the storing step, as long as there is no equivalence between the latter. The latter step can thus follow the step of reproducing a visual signal and/or acoustic signal executed by the auxiliary emitter 60 in order to give proof of occurred recognition of the acoustic signal to a user.

The invention claimed is:

1. An anti-abandonment system for warning of a potentially hazardous situation relating to a child or an infant present inside a vehicle, said vehicle being of a type comprising at least a safety belt for a driver, that safety belt comprising at least a webbing designed to restrain the body of the driver, at least one fastening tab permanently carried by the webbing and a fastening buckle associated with an anchorage point of the vehicle and configured to cooperate with the fastening tab to define:

a fastened condition of the safety belt during which the fastening tab and the fastening buckle are stably engaged with each other, an unfastened condition of the safety belt during which the fastening tab and the fastening buckle are uncoupled, wherein the anti-abandonment system comprises:

a first sensor associable with a restraining device, said restraining device being positionable inside the vehicle and configured to receive in abutment the child or the infant, wherein said first sensor is configured to emit a signal representative of the presence or not of the child or the infant on the restraining device, a second sensor associable with the safety belt of the driver of the vehicle and it is configured to emit a signal representative of the fastened condition or the unfastened condition of the safety belt, a control unit connected to the first and second sensors and configured to perform a control procedure comprising the steps of:

determining, as function of the signal emitted by the first sensor, the presence of the child or the infant on the restraining device, determining, as function of the signal emitted by the second sensor, the fastened condition or the unfastened condition of the safety belt, defining an alarm condition in the event that the control unit determines the presence of the child or the infant on the restraining device and at the same time the unfastened condition of the safety belt of the driver, wherein the second sensor is associable to only one of said fastening tab and said fastening buckle of the safety belt while on the other between said fastening buckle and said fastening tab the second sensor is not present, wherein the anti-abandonment system further comprises a coupling element configured to be stably engaged with the fastening buckle of the safety belt, wherein the second sensor is permanently carried by the coupling element, wherein the coupling element is made of a rigid material and comprises a first rigid jaw and a second rigid jaw defining a seat configured to receive a block of the fastening buckle, in which the first rigid jaw and the second rigid jaw are relatively movable with respect to each other at least between:

a spaced position in which the first rigid jaw and the second rigid jaw are configured to allow the positioning of the block in the seat; and a close position in which the first rigid jaw and the second rigid jaw are configured to stably constrain the block preventing relative displacement between the fastening buckle and the coupling element.

2. The system according to claim 1, wherein the signal emitted by the second sensor is representative of the presence of the fastening tab in engagement with the fastening buckle to define said fastened condition of the safety belt.

3. The system according to claim 2, further comprising an emitter connected to the control unit and associated with the coupling element, the emitter being configured to emit at least one among an acoustic signal, a haptic signal and a visual signal, wherein the control unit, following the definition of the alarm condition, is configured to command the emitter to emit at least one of the said acoustic, haptic and visual signals.

4. The system according to claim 2, wherein the fastening buckle comprises the block having a compartment wherein a locking mechanism is housed, wherein the fastening tab comprises an inserting portion to be inserted at least partially into the compartment of the block and to be stably engaged with the locking mechanism of the block,
   wherein the coupling element is engaged with the block of the fastening buckle outside the compartment,
   wherein the signal of the second sensor is representative of a position of the inserting portion of the fastening tab in the compartment of the block and then of an engagement condition of the inserting portion to the locking mechanism of the block to define said fastened condition of the safety belt,
   wherein the control unit is carried by the coupling element.

5. The system according to claim 4, wherein the block comprises a slot configured to allow the insertion of the inserting portion of the fastening tab into the compartment of the block, wherein the second sensor is configured to be placed in proximity of the slot of the block such that the second sensor directly detects the presence of the inserting portion.

6. The system according to claim 4, wherein the coupling element comprises:
   a support,
   at least one holding element engaged with the support, the holding element being configurable in an engagement configuration in which the holding element stably constrains the block preventing relative movement between the fastening buckle and the coupling element,
   wherein in said engagement configuration the holding element has at least one blocking portion active on the block on the opposite side of the support to secure the block and press the block towards the support holding the block in position,
   wherein the holding element is configured to define in cooperation with the support, a pass-through seat designed to receive the block.

7. The system according to claim 6, wherein said holding element, in cooperation with the support, defines a wrapping body configured to hold the block on all sides of the block, the wrapping body defining said seat having a passage of smaller overall dimensions than the transversal dimensions of the block to allow a stable interference coupling.

8. The system according to claim 6, wherein the holding element, in cooperation with the support, defines an external perimeter profile delimiting the seat, said seat being configured to receive by insertion the block of the fastening buckle.

9. The system according to claim 6, wherein the holding element is movable in respect to the support at least between:
   a first operating position wherein the holding element is disengaged from the support,
   a second operating position where the holding element is engaged with the support defining the seat,
   wherein in the second operating position, the holding element is engaged with the block of the fastening buckle.

10. The system according to claim 9, wherein the coupling element includes a locking system placed on the support and configured to secure the holding element in the second operating position, the holding element being movable with respect to the locking system during the movement between the first and second operating position, the holding element presenting an elongated body extending along a predetermined longitudinal profile between a first and a second end portion, said elongated body being engaged with the support at the first end portion and being engaged with the locking system, in the second operating position of the holding element, at the second end portion.

11. The system according to claim 1, wherein the second sensor comprises at least one of: an optical sensor, an infrared optical sensor, a capacitive sensor, a magnetic sensor, an ultrasonic transducer, a micro-switch, a micro-button.

12. The system according to claim 1, wherein the first sensor is connected via a wired circuit to the control unit and comprises at least between: a switch, or a micro-button, or a micro-switch,
   the first sensor comprises a weight sensor detecting a load on a predefined area of the restraining device dedicated to the accommodation of the child or the infant.

13. The system according to claim 1, further comprising a seating device associated to the restraining device and configured to be positioned on a predefined seating area of the restraining device aimed to accommodate the child or the infant, wherein the first sensor is associated with the seating device, the seating device comprising at least one casing within which the first sensor is housed.

14. The system according to claim 1, wherein the control unit includes:
   an electronic board,
   a microprocessor connected to the electronic board, and
   an emitter to emit an acoustic signal,
   wherein the first and second sensors are connected to the electronic board of the control unit which is configured to transmit the respective signals to the microprocessor which is configured to perform the control procedure, and
   the electronic board is connected to a power supply of the vehicle and includes an electric energy accumulator configured to electrically power the microprocessor of the control unit.

15. The system according to claim 14, wherein the control unit is configured to command the emitter to reproduce a specific acoustic signal indicative of a predetermined condition detected by the control unit, in one or more of the following predetermined conditions:
   presence of the child or infant on the restraining device,
   activation of the vehicle power supply,
   the fastened condition of the safety belt with driver's seat belt inserted,
   the unfastened condition of the safety belt with driver's seat belt not inserted when the vehicle is powered,
   lifting child with engine running while driving,
   engine power off,
   driver safety belt release,
   lifting child with engine off,
   said specific acoustic signal being different in relation to different predetermined conditions.

16. The system according to claim 14, comprising a mobile device including:
   an internal memory configured to one or more store reference signals;
   a microphone configured to detect acoustic signals; and
   a control unit connected to the internal memory and to the microphone, configured to perform an acoustic signal recognition procedure and to recognize the acoustic signal received, following recognition, the control unit being configured to determine a specific predetermined condition that has occurred.

17. The system according to claim 16, wherein the specific predetermined condition that has occurred is one of the following:
- presence of the child and/or infant on the restraining device,
- activation of the vehicle power supply,
- the fastened condition of the seat belt with driver's seat belt inserted,
- the unfastened condition of the seat belt with driver's seat belt not inserted when the vehicle is powered,
- lifting child with engine running while driving,
- engine power off,
- driver safety belt release,
- lifting child with engine off.

18. An anti-abandonment system for warning of a potentially hazardous situation relating to a child or an infant present inside a vehicle, said vehicle being of a type comprising at least a safety belt for a driver, that safety belt comprising at least a webbing designed to restrain the body of the driver, at least one fastening tab permanently carried by the webbing and a fastening buckle associated with an anchorage point of the vehicle and configured to cooperate with the fastening tab to define:
- a fastened condition of the safety belt during which the fastening tab and the fastening buckle are stably engaged with each other,
- an unfastened condition of the safety belt during which the fastening tab and the fastening buckle are uncoupled;

wherein the anti-abandonment system comprises:
- a first sensor associable with a restraining device, said restraining device being positionable inside the vehicle and configured to receive in abutment the child or the infant, wherein said first sensor is configured to emit a signal representative of the presence or not of the child or the infant on the restraining device,
- a second sensor associable with the safety belt of the driver of the vehicle and it is configured to emit a signal representative of the fastened condition or the unfastened condition of the safety belt, second sensor being associated with only one between said fastening tab and said fastening buckle, while on the other between said fastening buckle and said fastening tab the second sensor is not present; and
- a control unit connected to the first and second sensors and configured to perform a control procedure comprising the steps of:
  - determining, as function of the signal emitted by the first sensor, the presence of the child or the infant on the restraining device,
  - determining, as function of the signal emitted by the second sensor, the fastened condition or the unfastened condition of the safety belt,
  - defining an alarm condition in the event that the control unit determines the presence of the child or infant on the restraining device and at the same time the unfastened condition of the safety belt of the driver, wherein the anti-abandonment system further comprises a coupling element configured to be stably engaged with the fastening buckle of the safety belt, wherein the second sensor is permanently carried by the coupling element,
wherein the coupling element comprises a first jaw and a second jaw defining a seat configured to receive a block of the fastening buckle, in which the first jaw and the second jaw are relatively movable with respect to each other at least between:
- a spaced position where the first jaw and the second jaw are configured to allow the positioning of the block in the seat;
- a close position where the first jaw and the second jaw are configured to stably constrain the block preventing relative displacement between the fastening buckle and the coupling element, wherein the first jaw comprises one or more positioning elements defining an abutment surface for axially constrain the coupling element to the fastening buckle.

* * * * *